US006951097B2

(12) United States Patent
Moriya et al.

(10) Patent No.: US 6,951,097 B2
(45) Date of Patent: Oct. 4, 2005

(54) FLUID DISTRIBUTOR, BURNER APPARATUS, GAS TURBINE ENGINE AND CO-GENERATION SYSTEM

(75) Inventors: Koji Moriya, Chuo-ku (JP); Tsutomu Wakabayashi, Chuo-ku (JP); Takahiro Sako, Chuo-ku (JP); Yuji Nakamura, Chuo-ku (JP); Shonosuke Koga, Chuo-ku (JP); Masamichi Ippommatsu, Chuo-ku (JP); Seiichi Ito, Chuo-ku (JP); Kazuo Suzuki, Chofu (JP); Kazuo Shimodaira, Chofu (JP)

(73) Assignee: Osaka Gas Co., Ltd., Osaka (JP)

( * ) Notice: Subject to any disclaimer, the term of this patent is extended or adjusted under 35 U.S.C. 154(b) by 58 days.

(21) Appl. No.: 10/760,945

(22) Filed: Jan. 20, 2004

(65) Prior Publication Data

US 2005/0037305 A1 Feb. 17, 2005

Related U.S. Application Data

(62) Division of application No. 10/149,887, filed as application No. PCT/JP00/08760 on Dec. 11, 2000, now Pat. No. 6,684,641.

(30) Foreign Application Priority Data

| Dec. 15, 1999 | (JP) | ................................. 11-356251 |
| Dec. 15, 1999 | (JP) | ................................. 11-356252 |
| Dec. 15, 1999 | (JP) | ................................. 11-356253 |
| Feb. 18, 2000 | (JP) | ................................. 2000-41173 |
| May 19, 2000 | (JP) | ................................. 2000-148187 |

(51) Int. Cl.$^7$ ............................................. F02C 3/22
(52) U.S. Cl. ................................. 60/39.465; 60/737
(58) Field of Search ..................... 60/39.465, 746, 60/748, 737; 431/181, 185, 187

(56) References Cited

U.S. PATENT DOCUMENTS

| 2,780,916 A |   | 2/1957  | Collins |
| 2,807,316 A | * | 9/1957  | Jackson ........................ 431/352 |
| 2,949,012 A | * | 8/1960  | Ferrie et al. .................... 60/738 |
| 2,951,341 A | * | 9/1960  | Henning, Jr. et al. ........... 60/739 |
| 5,673,552 A |   | 10/1997 | Idleman et al. |

(Continued)

FOREIGN PATENT DOCUMENTS

DE          36 06 625 A        9/1986

(Continued)

Primary Examiner—Ehud Gartenberg
(74) Attorney, Agent, or Firm—Webb Ziesenheim Logsdon Orkin & Hanson, P.C.

(57) ABSTRACT

Disclosed is a burner apparatus comprising an inner tube defining a second channel and an outer tube defining a first channel surrounding the inner tube, air supplying means for supplying air to the first channel and the second channel, and gas supplying means for supplying fuel gas to the first channel and the second channel, either the first channel or the second channel being used as a main combustion channel and the other being used as a pilot combustion channel, the main combustion channel and the pilot combustion channel receiving the supply of fuel gas for combusting it. A plurality of first supply openings for supplying the fuel gas into the main combustion channel are distributed in the main combustion channel in a direction away from the pilot combustion channel. Discharging resistance of the fuel gas from each first supply opening due to passage of the oxygen-containing gas is set so as to increase as being distant from the pilot combustion channel.

3 Claims, 26 Drawing Sheets

U.S. PATENT DOCUMENTS 5,943,866 A     8/1999  Lovett et al.
6,070,410 A *   6/2000  Dean ........................... 60/737
6,158,223 A *  12/2000  Mandai et al. ................ 60/737
6,327,860 B1 * 12/2001  Critchley ..................... 60/737

FOREIGN PATENT DOCUMENTS

| | | |
|---|---|---|
| EP | 0 488 556 A | 6/1992 |
| EP | 870 989 A | 6/1992 |
| GB | 599 257 A | 3/1948 |
| JP | 07 248116 A | 9/1995 |
| JP | 8-261467 A | 10/1996 |
| JP | 9-250714 A | 9/1997 |
| JP | 11-270356 A | 10/1999 |
| WO | WO 99 04196 A | 1/1999 |

* cited by examiner

FLUID DISTRIBUTOR, BURNER APPARATUS, GAS TURBINE ENGINE AND CO-GENERATION SYSTEM

CROSS REFERENCE TO RELATED APPLICATION

This application is a divisional of U.S. patent application Ser. No. 10/149,887, filed Jun. 14, 2002, now U.S. Pat. No. 6,684,641, which is a 371 of PCT/JP00/08760, filed Dec. 11, 2000.

TECHNICAL FIELD

This invention relates to a burner apparatus comprising an inner tube defining a second channel and an outer tube defining a first channel surrounding the inner tube, air supplying means (an example of oxygen-containing gas supplying means) for supplying air (an example of oxygen-containing gas) to the first channel and the second channel, and gas supplying means for supplying fuel gas to the first channel and the second channel, either the first channel or the second channel being used as a main combustion channel and the other being used as a pilot combustion channel, the main combustion channel and the pilot combustion channel receiving the supply of fuel gas for combusting it. The invention relates also to a gas turbine engine including said burner apparatus and a co-generation system including the gas turbine engine. The invention further relates to a fluid distributor for use in such gas turbine engine including the burner apparatus, the co-generation system including the gas turbine engine, the burner apparatus, the distributor being disposed across three channels including first and second channels through which a first fluid such as air is caused to flow and a gas channel (an example of fluid channel) through which a second fluid such as fuel gas is caused to flow, so that the distributor distributes the fuel gas inside the fluid channel between the first channel and the second channel.

BACKGROUND ART

The burner apparatus described above is used as a burner apparatus for a gas turbine engine used in a co-generation system or a burner apparatus used for an incinerator. With this burner apparatus, it is necessary not only to adjust the flow amounts of the fuel gas to be fed to the main combustion channel and the pilot combustion channel in accordance with increase/decrease in the combustion load for assuring good combustion with maintaining appropriate equivalent ratio for the main combustion channel and the pilot combustion channel, but also to adjust the flow amounts of the air to be fed to the main combustion channel and the pilot combustion channel.

Conventionally, in order to make the adjustment of the flow amounts of the fuel gas to the main combustion channel and the pilot combustion channel, a flow-amount adjusting valve was provided in a fuel gas supply line to the main combustion channel and in a further fuel gas supply line to the pilot combustion channel, respectively, so as to make the adjustment of the flow amounts of the fuel gas to the main combustion channel and to the pilot combustion channel, independently of each other.

However, according to the prior art described above, as the adjustment of the supply amount of fuel gas to the first channel and that to the second channel in accordance with the combustion load are effected independently of each other, the adjustment operation was troublesome.

Further, in the case of the burner apparatus of the above type which effects pilot combustion and main combustion, the supply amounts of fuel gas respectively to the main combustion channel and to the pilot combustion channel are reduced in association with decrease in the combustion load relative to a rated combustion load. In association with such decrease in the supply amount, it is necessary to increase the supply amount to the pilot combustion channel to maintain stable pilot combustion.

Moreover, with such burner apparatus, it is especially needed to mix fuel gas and air in a reliable manner inside the first channel in which the main combustion is effected. For, if they are not mixed well, there occurs unevenness in the equivalent ratio in the fuel-air mixture containing the fuel gas and the air in a mixed state, so that in a region of a higher equivalent ratio high-temperature combustion will occur, resulting in increase in NOx generation amount.

According to the conventional burner apparatus, as shown in FIG. 44, a supply line provided within the combustion channel for receiving fuel gas supply defines a plurality of supply openings arranged in dispersion for discharging the fuel gas through the plural openings to the combustion channel. In this case, the plural supply openings are opened on the downstream side in the direction of air flow in the combustion channel, so as to discharge the fuel gas in the same direction as the air. With this construction, by dispersing the supply of fuel gas to the combustion channel, the apparatus was designed to improve the mixing degree between the air and the fuel gas G.

With such conventional burner apparatus, in order to achieve uniformity in the supply of fuel gas to the combustion channel by providing a plurality of supply openings for one supply line, it is desirable for the supply openings to be provided as many as possible. However, as the total amount of fuel gas to be supplied to the combustion channel is determined in advance, as the number of the supply openings is increased, it becomes necessary to reduce the opening area of each supply opening.

As a result, there occurs increased pressure loss at the supply openings. Then, in order to discharge a predetermined amount of the fuel gas, it becomes necessary to supply the fuel gas with an increased pressure into the supply line, thus requiring disadvantageous physical and capacity enlargement of the gas supplying means for the burner apparatus.

Incidentally, the equivalent ratio represents an amount indicative of concentration aspect of the fuel-air mixture of the fuel and the combustion air and this is defined herein as follows.

equivalent ratio=(fuel concentration/air concentration)/(fuel concentration/air concentration)$st$ Each concentration is represented in the mole value, and (fuel concentration/air concentration)st is a theoretical fuel-air ratio. This theoretical fuel-air ratio is the concentration ratio between an amount of fuel and air needed for complete oxidation of that amount of fuel.

DISCLOSURE OF THE INVENTION

Therefore, an object of the present invention is to provide a fluid distributor which allows easy adjustment of the supply amounts of fuel gas to the main combustion channel and the pilot combustion channel depending e.g. on the combustion load and which also allows increase in the distribution ratio of the supply amount to the pilot combustion channel in association with decrease in the supply amount, as well as a preferred burner apparatus using the distributor, a gas turbine engine including the burner apparatus and a co-generation system including the gas turbine engine.

A further object of the present invention is to provide a burner apparatus which achieves reduced pressure loss occurring when the fuel gas is supplied to the combustion channel and which also achieves superior mixing of the fuel gas and the air.

In order to accomplish the above-noted objects, the burner apparatus according to the present invention is characterized in that said gas supplying means includes a plurality of fluid distributors arranged in dispersion in a peripheral direction of the main combustion channel and the pilot combustion channel, each fluid distributor including a first supply opening for supplying the fuel gas into the main combustion channel, a supply line for supplying the fuel gas present inside the gas channel to the first supply opening, and distributing means incorporated in the supply line for distributing the fuel gas into the pilot combustion channel so that the distribution ratio of the fuel gas to be supplied to the first supply opening is increased in response to increase in a total supply amount of the fuel gas from the gas channel and conversely the distribution ratio of the fuel gas to be supplied to the first supply opening is decreased in response to decrease in the total supply amount.

Further, the burner apparatus according to the present invention, in addition to the burner apparatus construction described above, is further characterized in that the first channel is used as the main combustion channel and the second channel is used as the pilot combustion channel.

That is to say, the first channel used as the main combustion channel receives air from the air supplying means and receives also the fuel gas present inside the gas channel via the gas supplying means, so that the fuel-air mixture of the air and the fuel gas is produced therein and this fuel-air mixture is ignited to provide main combustion of the fuel-air mixture. On the other hand, the second channel used as the pilot combustion channel receives the air from the air supplying means and receives also the fuel gas present inside the gas channel via the gas supplying means, so that the fuel-air mixture of the air and the fuel gas is produced therein and this fuel-air mixture is ignited to provide pilot combustion of the fuel-air mixture.

And, the gas supplying means comprises the fuel distributors adapted for supplying the fuel gas to the main combustion channel and the pilot combustion channel and adapted also for distributing the fuel gas present inside the gas channel between the main combustion channel and the pilot combustion channel. That is, as the fluid distributor includes the distributing means incorporated within the supply line for supplying the fuel gas inside the gas channel to the main combustion channel via the first supply opening, the distributor distributes the fuel gas to the main combustion channel and also to the pilot combustion channel. Further, the distributor is constructed so that the distribution ratio of the fuel gas to be supplied to the first supply opening is increased in response to increase in a total supply amount of the fuel gas from the gas channel and conversely the distribution ratio of the fuel gas to be supplied to the first supply opening is decreased in response to decrease in the total supply amount.

Therefore, it is not necessary to adjust the supply amount of the fuel gas to the main combustion channel and the supply amount of the fuel gas to the pilot combustion channel respectively and independently of each other. Rather, adjustment of the distribution ratio of the fuel gas between the main combustion channel and the pilot combustion channel in accordance e.g. with variation in the combustion load can be done simply by adjustment of the total supply amount of the fuel gas to the fuel gas channel. Moreover, with the burner apparatus according to the present invention, in association with decrease in the total supply amount of the fuel gas at the time of low combustion load, the supply amount of the fuel gas to the pilot combustion channel is increased to provide stable pilot combustion; whereas, in association with increase in the total supply amount of the fuel gas at the time of rated combustion load, the supply amount of fuel gas to the main combustion channel is increased, thereby to uniformly supply the fuel gas to the main combustion channel and the pilot combustion channel so as to realize low NOx combustion with lean fuel-air mixture. As a result, with such simple construction, it is possible to achieve higher efficiency over a wide combustion load range.

In addition, since a plurality of such fluid distributors for supplying the fuel gas to the main combustion channel and the pilot combustion channel are distributed along the peripheral direction of the main combustion channel and the pilot combustion channel, the fuel gas may be supplied in distribution in the peripheral direction into the main combustion channel and the pilot combustion channel, thereby to provide good mixing between the fuel gas and air inside the main combustion channel and the pilot combustion channel. As a result, uniformity of the fuel-air mixture can be obtained.

Also, with the burner apparatus of the present invention, in the outer first channel and the inner second channel, either combustion channel may be used as the main combustion channel. However, by using the outer first channel as the main combustion channel and the inner second channel as the pilot combustion channel, it becomes possible to increase the fuel gas in the inner pilot combustion channel at the time of low combustion load for increasing the distribution ratio of the fuel gas for the pilot combustion channel, thereby to provide stable pilot combustion in the pilot combustion channel.

Moreover, in this case of using the outer first channel as the main combustion channel and the inner second channel as the pilot combustion channel, it is possible to insert a gas tube defining the gas channel into the inner tube defining the second channel as the pilot combustion channel, whereby the gas channel, the pilot combustion channel and the main combustion channel are formed in this order from the inner side to the outer side, and the supply line for supplying the fuel gas from the gas channel to the first supply opening is formed to transverse the pilot combustion channel. Hence, the distributing means can be formed easily at this portion where the supply line(s) transverses the pilot combustion channel.

On the other hand, if the outer first channel is used as the pilot combustion channel and the inner second channel is used as the main combustion channel, it becomes possible to reduce the length of an ignition plug which is to be inserted into the pilot combustion channel from the outside.

Incidentally, as each of the inner tube and outer tube described above, a tube having a circular cross section may be employed of course. However, an angular tube having a polygonal cross section can be employed instead for example.

Further, the burner apparatus of the present invention, in addition to the burner apparatus construction described above, is further characterized in that in the distributing means includes, in the supply line, a second supply opening for discharging the fuel gas into the pilot combustion channel in a direction normal to the flowing direction of the air inside the pilot combustion channel and a communication line for receiving the fuel gas discharged from the second supply opening and guiding the gas into the first supply opening, and at a position opposed to the second supply opening and spaced apart by a predetermined distance in the discharging direction of the second supply opening, there is provided a receiving opening of the communication line as to be open toward the second supply opening.

That is, with the burner apparatus of the present invention, the gas tube is provided adjacent the pilot combustion channel and its gas channel includes the second supply opening for discharging the fuel gas to the pilot combustion channel and the receiving opening is provided at the portion of the inner tube opposed to the second supply opening via the pilot combustion channel and to which the discharge of the fuel gas is oriented.

Namely, the fuel gas supplied into the gas channel is discharged through the second supply opening toward the receiving opening to the pilot combustion channel.

And, in a second gas supply area where the fuel gas discharged in the pilot combustion channel is present, a portion of the fuel gas transversing the pilot combustion channel will be carried away by the air current of the pilot combustion channel to the downstream side of this pilot combustion channel while the rest of the fuel gas will be carried across the air current of the pilot combustion channel to reach the first supply opening via the receiving opening and will eventually be supplied to the main combustion channel.

More particularly, of the fuel gas discharged from the second supply opening into the pilot combustion channel, its portion introduced into the communication line from the receiving opening is guided via the communication line to the first supply opening to be supplied into the main combustion channel, whereas the remaining portion of the fuel gas not introduced into the receiving opening is supplied to the pilot combustion channel. And, the greater the supply amount and the higher the speed of the fuel gas discharged from the second supply opening, the higher the ratio of the portion of the fuel gas discharged from the second supply opening to enter the receiving opening. As a result, the greater the supply amount of the fuel gas, the greater the distribution ratio of the fuel gas for the first supply opening, that is, for the side of the main combustion channel. Conversely, the smaller the supply amount of the fuel gas, the smaller the distribution ratio of the fuel gas for the side of the main combustion channel.

Therefore, in the burner apparatus, by simply providing the second supply opening and the communication line having the receiving opening, with such simple construction, the distributing means of the fluid distributor may be provided.

Further, the amount of air flowing in the pilot combustion channel is normally contained within a predetermined range, so that e.g. the positional relationship between the second supply opening and the receiving opening is fixedly established. Hence, by increasing the supply amount of the fuel gas from the second supply opening, the ratio between the amount of the fuel flowing to the downstream side of the pilot combustion channel and the amount of the fuel to be supplied to the pilot combustion channel may be reversibly varied in association with increase/decrease in the fuel supply amount.

Further, the burner apparatus of the present invention, in addition to the burner apparatus construction described above, is characterized further in that said fluid distributor includes a plurality of said first supply openings distributed in the main combustion channel in a direction away from the pilot combustion channel.

That is, by using the fluid distributors mounted inside the main combustion channel with the plurality of first supply openings distributed in the direction away from the pilot combustion channel, i.e. in the radial direction of the first and second channels, even greater uniformity of the fuel-air mixture can be obtained, thereby to reduce the equivalent ratio for NOx generation reduction by lean combustion and also for stabilization of the lean combustion.

Further, the burner apparatus of the present invention, in addition to the burner apparatus construction described above, is characterized in further that the supply line is provided in correspondence to each of the plurality of first supply openings.

That is to say, as the supply line is provided in correspondence to each of the plurality of first supply openings, in comparison with e.g. a case in which the fuel gas is supplied to the plurality of first supply openings via one supply line, it is possible to reduce the pressure loss which would occur for supplying the fuel gas uniformly from the plurality of first supply openings.

Therefore, it becomes possible to further improve the uniformity of the mixture between the air and the fuel gas inside the main combustion channel while reducing the pressure loss, so that the pressure loss associated with the fuel gas supply may be reduced while maintaining the low NOx generation performance.

Further, the burner apparatus of the present invention, in addition to the burner apparatus construction described above, is characterized in further that the fluid distributor is constructed such that the supply lines corresponding to the plurality of first supply openings are formed in a plate-like member disposed within the main combustion channel with its plate surface oriented along the air flow direction.

That is to say, the plurality of supply lines are formed in the plate-like member disposed within the main combustion channel in alignment with the air flow direction, so that the plate-like member forming the supply line is disposed along the air flow direction. Hence, in spite of the provision of the plurality of supply lines, this hardly interferes with the air flow.

Moreover, as the plurality of supply lines are formed together as a group within the plate-like member, the handling such as assembly is easy.

Therefore, it is possible to supply the fuel gas uniformly relative to the air while maintaining good air flow in the main combustion channel. Further, in spite of the provision of the plurality of supply lines, the handling such as maintenance, assembly or the like is improved.

Further, the burner apparatus of the present invention, in addition to the burner apparatus construction described above, is characterized in further that the plate-like members of the plurality of fluid distributors are disposed with each plate surface thereof oriented along the spiral direction of the main combustion channel so as to act as a fin of a swirler for providing a swirling force to the supplied air.

In such burner apparatus, as the swirler provides the swirling force to the air to be supplied to the main combustion channel to enhance the mixing degree between the air and the fuel gas, the lean combustion can take place effectively. In this regard, attention was directed to the fact that the fluid distributor for distributing the fuel gas inside the gas channel to the main combustion channel and the pilot combustion channel includes the plate-like member forming the first supply openings and the supply lines. Then, by disposing this plate-like member in alignment with the spiral direction of the main combustion channel, this plate-like member can constitute a swirler fin. Hence, the fluid distributor and the swirler can share the same member.

Accordingly, while achieving the improved uniformity in the mixing performance, it has become possible to achieve simplification and cost reduction of the construction.

Further, the burner apparatus of the present invention, in addition to the burner apparatus construction described above, is characterized in further that at a portion of the main combustion channel more downstream than the first supply openings in the air flow direction, there is provided a swirler for providing a swirling force to the fuel-air mixture of the air and the fuel gas in the spiral direction of the main combustion channel.

In the burner apparatus of the present invention, at the portion of the main combustion channel on the downstream of the fluid distributors, the swirler for improving flame stability of the main combustion may be provided for providing a swirling force to the fuel-air mixture of the air and the fuel gas. So that, the orientation of the first supply opening may be simple. Moreover, without disturbing the air flow at the first supply opening, the fuel-air mixture may be swirled for improving the flame stability of the main combustion.

Accordingly, it has become possible to further improve the lean combustion performance.

Further, the burner apparatus of the present invention is characterized in further that the first supply opening is disposed, in the main combustion channel, with an orientation for discharging the fuel gas toward more upstream side of the flow direction of the oxygen-containing gas than the direction normal to the flow direction of the oxygen-containing gas.

That is, by disposing the first supply opening with such orientation for discharging the fuel gas toward more upstream side of the flow direction of the air than the direction normal to the air flow direction, the fuel gas is to be discharged against the flow of the air in the main combustion channel. As a result, the fuel gas and the air will collide against each other for providing natural stirring and mixing of the fuel gas in the air and will be diffused in both the radial and peripheral directions of the main combustion channel.

In this way, with the burner apparatus of the present invention, for achieving the uniform discharge of the fuel, it is not needed to provide a great number of first supply openings of a small diameter. Instead, this is possible by increasing the aperture diameter of the first supply opening. Therefore, no significant pressure loss occurs in association with the supply of the fuel, and the mixing degree between the fuel gas and the air may be enhanced by utilizing the air flow.

Moreover, in order to allow the fuel gas to be discharged from the first supply opening, this is possible by providing the fuel gas with a pressure overwhelming the pressure of the circulating air. In this regard, this air pressure is of such magnitude as hardly affects the discharging of the fuel gas. Accordingly, it is not necessary to enlarge the gas supplying means for supplying the fuel gas. Instead, the fuel gas may be mixed reliably with a simple device. Consequently, it becomes possible to provide a burner apparatus which achieves further reduction in NOx generation amount.

And, in combination with the fluid distributor used as the gas supplying means in the present invention, in the distributing means, in supplying the fuel gas through the route from the second supply opening, the pilot combustion channel, the receiving opening, the first supply opening to the main combustion channel, as the first supply opening is configured, as described above, to discharge the fuel gas toward the upstream side in the air flow direction thereby to reduce the pressure loss through the first supply opening, the fuel gas discharged from the second supply opening into the pilot combustion channel may be received efficiently into the receiving opening communicated with the first supply opening with the reduced pressure loss. Thus, the mechanism can be realized with a relatively simple construction.

Further, the burner apparatus of the present invention, in addition to the burner apparatus construction described above, is characterized in further that the first supply opening is disposed, in the main combustion channel, with an orientation for discharging the fuel gas in a direction opposing to the air flow direction.

That is to say, in the case of this construction in which the first supply opening is configured to discharge the fuel gas in the direction opposing to the flow direction of the air, the relative speed between the fuel gas and the air discharged is maximized, so that the mixing degree of the fuel-air mixture in the main combustion channel can be maximized as well.

Further, the burner apparatus of the present invention is characterized in further that the main combustion channel includes a mixing promoting member against which the fuel gas discharged from the first supply opening into the main combustion channel is collided to be diffused in the main combustion channel or the pilot combustion channel includes a mixing promoting member against which the fuel gas discharged from the second supply opening for supplying the fuel gas into the pilot combustion channel is collided to be diffused in the pilot combustion channel.

Further, in the case of the apparatus being combined with the fluid distributor as the gas supplying means in the present invention, the burner apparatus of the present invention is characterized in that the apparatus includes a mixing promoting member against which the fuel gas discharged from the first supply opening into the main combustion channel is collided to be diffused in the main combustion channel.

That is to say, by providing such mixing promoting member, it is possible to collide the fuel gas discharged from the supply opening against the mixing promoting member to be diffused thereby, so that the fuel-air mixture may be rendered further uniform in the main combustion channel or in the pilot combustion channel.

Moreover, the burner apparatus of the present invention, in addition to the burner apparatus construction described above, is characterized in further that the mixing promoting member comprises a ring-like member disposed along the peripheral direction of the main combustion channel or the pilot combustion channel and having a plate face along the discharging direction of the fuel gas of the plurality of first supply openings or second supply openings distributed along the peripheral direction.

That is to say, the mixing promoting member can be provided as a ring-like member disposed continuously or intermittently across the plurality of first or second supply openings arranged in the peripheral direction of the main combustion channel or the pilot combustion channel. Namely, by causing the fuel gas discharged from the plurality of supply openings arranged in the peripheral direction to collide against the plate surface of this ring-like mixing promoting member, it is possible to diffuse the fuel gas at least in the peripheral direction of the combustion channel.

Further, if the distance between the mixing promoting member and the respective supply openings is too small, this will increase discharging resistance of the fuel gas. Conversely, if the distance is too large, the diffusion of the fuel gas will not be able to take place effectively. Therefore, this distance will be set appropriately, taking into consideration the discharging resistance and the diffusion condition.

Further, in the case of the combination with the fluid distributor as the gas supplying means of the present invention, this mixing promoting member is provided for the first supply openings of the main combustion channel to be utilized for diffusion of the fuel in the main combustion channel. And, by providing the mixing promoting member in the main combustion channel, it is not needed to provide a great number of first supply openings of a small diameter. Instead, it is possible to enlarge the aperture diameter of the first supply opening. Therefore, no significant pressure loss occurs in association with the supply of the fuel, and the mixing degree between the fuel gas and the air may be enhanced by utilizing the air flow. Further, with the reduction of the pressure loss at the first supply openings, the fuel gas discharged from the second supply opening into the pilot combustion channel may be effectively received in the receiving opening communicated with the first supply openings with the reduced pressure loss. In this manner, the mechanism can be realized with a relatively simple construction.

Further, the burner apparatus of the present invention, in addition to the burner apparatus construction described above, is characterized in further that there is provided a second shielding member for adjusting an inflow amount of the oxygen-containing gas, for the second gas supply area extending from the upstream side of the second supply opening in the flow direction of the oxygen-containing gas via the second supply opening of the pilot combustion channel to the receiving opening.

That is to say, by providing the second shielding member on the upstream side of the second supply opening of the second channel as proposed by this construction, it becomes possible to restrict inflow of the air into the second gas supply area from the upstream side of the pilot combustion channel, thereby to appropriately adjust the inflow amount of the air into the second gas supply area. As a result, in the second gas supply area, the ratio of the fuel gas reaching and entering the second supply opening may be adjusted appropriately, so that the distribution ratio of the fuel gas for the main combustion channel may be adjusted to suit the operation condition of the burner apparatus.

Further, as this second shielding member restricts the air entering the second gas supply area from the upstream side, by enlarging the diameter of the second supply opening, the discharging speed of the fuel gas may be reduced for reducing the pressure loss of the fuel gas at the second supply opening.

Further, the burner apparatus of the present invention, in addition to the burner apparatus construction described above, is characterized in further that the second shielding member comprises a member disposed across at least a portion of the second gas supply area upstream in the flow direction of the oxygen-containing gas.

That is, as the second shielding member, it is possible to employ a e.g. flat-plate-like or curved-plate-like member which is disposed across at least a portion of the second gas supply area upstream in the air flow direction and which has a plate surface extending, in e.g. the second channel upstream in the air from of the second supply opening, from a wall portion of the gas channel to a wall portion of the main combustion channel, in a direction normal to or inclined relative to the air flow direction.

In this case too of providing such plate-like member described above, it is possible to restrict inflow of the air from the upstream side of the air flow direction in the pilot combustion channel, for the second gas supply area where the fuel gas is supplied in the pilot combustion channel, thereby to appropriately adjust the inflow amount of air into this second gas supply area, so that the distribution ratio of the fuel gas between the main combustion channel and the pilot combustion channel may be adjusted to suit the operation condition of the burner apparatus.

Further, the burner apparatus of the present invention, in addition to the burner apparatus construction described above, is characterized in further that the second shielding member comprises a tubular member which surrounds a portion of the second gas supply area.

That is to say, the second shielding member may be provided for example as a cylindrical or angular tubular member which extends from the outer periphery of the second supply opening toward the main combustion channel to surround a portion of the second gas supply area.

Further, in the second gas supply area surrounded by such tubular member, the inflow of the air from the upstream side may be restricted reliably and also the discharging direction of the fuel gas may be adjusted with high precision. Also, at the terminal end of the tubular member of the pilot combustion channel, there is formed a slit exposed to the air flow of the pilot combustion channel in the second gas supply area. Accordingly, by appropriately setting the width of this slit through adjustment of the height of this tubular member in the axial direction interconnecting the first and second supply openings, the influence of the air flowing into the slit on the flow of the fuel gas may be precisely adjusted to be advantageous and the distribution ratio of the fuel gas between the main combustion channel and the pilot combustion channel may be adjusted to further suit the operation condition of the burner apparatus.

Further, the burner apparatus of the present invention, in addition to the burner apparatus construction described above, is characterized in further that the second shielding member defines an opening for adjusting the inflow condition of the oxygen-containing gas to the second gas supply area.

Namely, by defining at least one circular, slit-like or polygonal opening in the plate-like member as the second shielding member as proposed by this construction, the inflow amount or distribution of the inflow air as the inflow condition of the air into the second gas supply area may be adjusted.

That is to say, the air will flow via the opening through the plate-like member and this through air will flow into the second gas supply area. Hence, by appropriately forming the opening, it is possible to adjust the ratio of the fuel gas passing the second gas supply area and flowing through the receiving opening and the first supply openings into the main combustion channel to suit the operation condition of the burner apparatus.

Further, the burner apparatus of the present invention is characterized in further that discharging resistance of the fuel gas from each said first supply opening due to passage of the oxygen-containing gas is set so as to increase as being distant from the pilot combustion channel.

That is, according to this construction, the main combustion channel includes the plurality of first supply openings for the fuel gas diffused in the direction away from the pilot combustion channel, and discharging resistance of the fuel gas from each said first supply opening due to passage of the oxygen-containing gas is set so as to increase as being distant from the pilot combustion channel. With this, when the supplying pressure of the fuel gas is higher at the time of the rated combustion load, at all of the first supply openings, the fuel gas is supplied to the main combustion channel, overcoming the discharging resistance. Conversely, when the supplying pressure of the fuel gas is low at the time of low combustion load, at those first supply openings of the main combustion channel which opening are disposed away from the pilot combustion channel and provides higher discharging resistance, the discharging of the fuel gas is inhibited by the discharging resistance, so that the fuel gas is discharged to the main combustion channel only from those first supply openings disposed close to the pilot combustion channel.

Therefore, at the time of rated combustion load, the fuel gas may be supplied entirely in the width direction of the main combustion channel (the direction distant from the pilot combustion channel) to provide the rated combustion load operation with high combustion load. Conversely, in the case of the low combustion load operation, the fuel gas may be supplied more to the portion of the main combustion channel close to the pilot combustion channel than the case of the rated combustion load. Further, in combination with the fluid distributor as the gas supplying means of the present invention, the fuel gas for the main combustion may be ignited and combusted in the pilot combustion under advantageous conditions. Hence, high efficiency is obtained over the wide combustion load range.

Further, the burner apparatus of the present invention, in addition to the burner apparatus construction described above, is characterized in further that the setting of the discharging resistance of the fuel gas is done such that a discharging angle for the fuel gas at each said first supply opening toward the upstream side in the flow direction of the oxygen-containing gas in the main combustion channel is decreased as being distant from the pilot combustion channel.

That is, according to this construction, the discharging angle for the fuel gas at each first supply opening toward the upstream side in the flow direction of the air in the main combustion channel is decreased continuously or stepwise as being distant the pilot combustion channel. With this, those first supply openings disposed away from the pilot combustion channel rather than the first supply openings disposed adjacent the pilot combustion channel will discharge the fuel gas against the flow of the air, thus the discharge gas will experience greater discharging resistance from the air flow. Hence, as the burner apparatus having this construction is capable of supplying the fuel gas to the portion adjacent the pilot combustion channel more at the time of low combustion load than at the time of the rated combustion load, so that the fuel gas for the main combustion may be ignited and combusted in the pilot combustion under the advantageous condition.

Further, the burner apparatus of the present invention, in addition to the burner apparatus construction described above, is characterized in further that the setting of the discharging resistance of the fuel gas is done such that the discharging direction of the fuel gas from the plurality of first supply openings is set to be more upstream than the direction normal to the flow direction of the oxygen-containing gas in the main combustion channel and also that the opening area of each said first supply opening is increased as being distant the pilot combustion channel.

That is to say, according to the present construction, by setting the discharging direction of the fuel gas from the plurality of first supply openings to be more upstream than the direction normal to the flow direction of the air in the main combustion channel, at each first supply opening, the fuel gas will experience discharging resistance in the flow direction of the air, and the greater the opening area of the first supply opening, the greater this discharging resistance of the fuel gas.

Then, by adapting the opening area of the first supply openings to continuously or stepwise increase as being distant the pilot combustion channel, discharging resistance for the fuel gas may be set greater for those first supply openings disposed away from the pilot combustion channel than the first supply openings disclosed closer to the pilot combustion channel. Therefore, with the burner apparatus having this construction, more of the fuel gas may be supplied to the portion close to the pilot combustion at the time of low combustion load than at the time of the rated combustion load. Hence, the fuel gas for the main combustion may be ignited and combusted under the advantageous condition in the pilot combustion.

Further, the burner apparatus of the present invention is characterized in further that the first supply openings are configured to supply the fuel gas into the first channel along the direction of the main combustion channel distant from the pilot combustion channel; and a first shielding member is provided for preventing inflow of the air from the upstream side along the flow direction of the air in the first channel, for a first gas supply area formed by the fuel gas supplied from the first gas supply openings inside the main combustion channel.

That is, by providing the burner apparatus of the invention with the first shielding member for preventing inflow of the air from the upstream side in the air flow direction of the main combustion channel, i.e. along the axial direction of the inner tube and outer tube, for the gas supply area where the fuel gas is supplied in the main combustion channel, the fuel gas supplied along the direction away from the inner tube and the outer tube will experience of less influence form the air flow, so that the gas will be readily diffused toward the outer side of the main combustion channel relative to the pilot combustion channel. For this reason, the mixing between the fuel gas and the air inside the main combustion channel will take place uniformly, thereby to achieve low NOx generation in the main combustion.

If the fuel gas can be readily diffused to the outer side of the main combustion channel, the discharging speed of the fuel gas at the first supply openings may be reduced. Then, the supply pressure of the fuel gas may be reduced, for example. As a result, the pressure loss in the gas supplying means may be reduced and the such devices as the gas supplying means may be formed compact.

And, in combination with the fluid distributor as the gas supplying means in the present invention, in the distributing means, in supplying the fuel gas through the route from the second supply opening, the pilot combustion channel, the receiving opening, the first supply opening to the main combustion channel, as the first shielding member is provided as above for reducing the pressure loss at the first supply opening, the fuel gas discharged from the second supply opening into the pilot combustion channel may be received efficiently into the receiving opening communicated with the first supply opening with the reduced pressure loss. Thus, with such very simple construction of the gas supplying means, the combustion condition of the main combustion in the main combustion channel and the combustion condition in the pilot combustion in the pilot combustion channel may be set appropriately.

Moreover, if the first shielding member assures the diffusion of the fuel gas into the main combustion channel, the equivalent ratio of the mixture of the air and the fuel gas will be rendered constant at any position in the main combustion channel. As a result, such inconvenience as occurrence of local high-temperature combustion can be avoided, so that the combustion can take place with reduced NOx generation.

Further, the burner apparatus of the present invention, in addition to the burner apparatus construction described above, is characterized in further that a ratio (c/e) between a distance (c) between the opening center of the first supply opening and the first shielding member defined along the air flow direction of the main combustion channel and an opening width (e) of the first supply opening defined in said direction is set to be greater than or equal to 0.5 and smaller than or equal to 1.5.

That is to say, the distance between the first supply opening and the shielding member is specified within a fixed range. Namely, the setting of the ratio (c/e) to 0.5 means that the fuel gas first supply opening is disposed adjacent the shielding member. On the other hand, the setting of the ratio (c/e) to 1.5 means that the distance between the first shielding member and the edge of the first supply opening is equal to the opening width of the fuel supply opening in the axial direction of the pilot combustion channel, in other words, in the axial direction of the inner tube and the outer tube.

By setting the distance between the first supply opening and the shielding member as described above, it is possible to minimize the influence of the air on the fuel gas supplied from the first supply opening into the main combustion channel. Accordingly, the uniformity of the fuel gas to the main combustion channel will be further assured and further reduction in NOx generation in the main combustion can be obtained.

Further, the burner apparatus of the present invention, in addition to the burner apparatus construction described above, is characterized in further that the first shielding member comprises a member which extends in the direction where the main combustion channel extends away from the pilot combustion channel, one first end of the first shielding member on the side adjacent the first supply opening has a width (a) along the peripheral direction of the main combustion channel, the other second end has a width (b) along the peripheral direction, the first supply opening has a width (d) along the peripheral direction; and a ratio (a/d) between said width (a) and said width (d) is greater than or equal to 1 and smaller than or equal to 3, and a ratio (b/d) between said width (b) and said width (d) is greater than or equal to 0 and smaller than or equal to 2.

That is to say, the first shielding member extends, in the main combustion channel, in the direction away from the pilot combustion channel, i.e. in the radial direction of the inner tube and the outer tube and this member has the first and second ends as its opposed ends in the extending direction. And, this construction defines the relationships between the widths of these opposed ends and the opening width of the first supply opening.

Namely, of the two ends of the first shielding member, the one end on the side adjacent the first supply opening is provided as the first end, and the other end apart from the first supply opening is provided as the second end, and the width of the first end in the peripheral direction of the main combustion channel is specified to be one to three times greater than the opening width of the first supply opening in the peripheral direction. That is to say, by setting the width of the first end greater than the width of the first supply opening, direct collision of the air against the fuel gas discharged from the first supply opening to the main combustion channel is avoided. With this, of the velocity of the discharged fuel gas, its radial velocity component can be maintained well in particular, whereby the uniform mixing effect of the fuel gas in the radial direction is improved.

On the other hand, the width of the second end along the peripheral direction is set to be greater than or equal to 0 or smaller than or equal to 2 times greater than the opening width of the first supply opening in the same direction. The fuel gas discharged from the first supply opening into the main combustion channel will flow outward in the radial direction with more or less diffusion. However, due to the discharging speed of the fuel gas or various conditions such as the radial size of the main combustion channel, there will occur a difference in the diffusion conditions in the fuel gas which has reached the vicinity of the second end. Namely, by varying the amount of the air to collide against the fuel gas depending on the degree of diffusion, the equivalent ratio of the fuel-air mixture will be rendered constant through the entire main combustion channel.

Needless to say, the width of the second end may be zero also. That is, if it is desired to cause a large amount of air to collide against the fuel gas so as to increase the siring effect, the width of the second end will be set as zero. However, in case the diffusion of the fuel gas has developed already in the vicinity of the second end, if the air flow is caused to collide directly thereto, it will be difficult to diffuse the fuel gas to the outermost side of the main combustion channel. In such case, the width of the second end will be set as e.g. about 2 times greater than the width of the first supply opening.

With this construction, it is possible to increase/decrease the degree of diffusion of the fuel gas in the radial direction of the main combustion channel. Therefore, the equivalent ratio of the fuel-air mixture in the main combustion channel may be made uniform and low NOx generation can be realized while providing the gas supplying means as means with reduced pressure loss.

Further, the burner apparatus of the present invention, in addition to the burner apparatus construction described above is characterized in further that a hollow tubular fuel supplying member having a porous wall portion is attached to the first supply opening.

That is to say, as proposed by the present construction, if the porous fuel supplying member is attached to the first supply opening for the fuel gas, the fuel gas will be gradually discharged through the pores formed in the wall portion of the fuel supplying member when the fuel gas moves in the radial direction of the main combustion channel, in other words, in the direction of the cross section of the channel of the main combustion channel. Therefore, the fuel gas may be diffused uniformly over the entire main combustion channel.

In this, it is desired, however, that the porous material used in this construction should have coarse pores as they are needed for preventing pressure loss in fuel supply. That is, the fuel supplying member used in this construction should be such that it can restrain easy diffusion of the fuel gas when the fuel gas flows outwards in the radial direction. For instance, in case this fuel supplying member is disposed in the flow of the air, the member should have such pores as allow easy entry of this air flow into the interior of the fuel supplying member.

If such fuel supplying member is provided and also the first shielding member is provided on the upstream of this fuel supplying member, the fuel gas diffusion restraining effects of these two members will be combined to reliably allow the fuel gas to be diffused to the outer side of the main combustion channel.

Further, the burner apparatus of the present invention, in addition to the burner apparatus construction described above, is characterized in further that said fluid distributor comprises a distributing member which is provided in the main combustion channel and defines the first supply opening in its outer surface, and which forms therein an air inlet duct (an example of an oxygen-containing gas inlet duct) for guiding the air supplied from the supply line and the air supplying means to the pilot combustion channel, and said distributing means includes, in said distributing member, a second supply opening for discharging the fuel gas into the air inlet duct in a direction intersecting the flow direction of the air inside the air inlet duct, a communication line for receiving the fuel gas discharged from the second supply opening and guiding it to the first supply opening, and a receiving opening for the communication line disposed at a position opposing to the second supply opening with a predetermined distance relative thereto in the discharging direction, with the receiving opening being open to the second supply opening.

That is to say, the distributing member is provided in the main combustion channel and the wall portion of the air inlet duct formed inside this distributing member for introducing the air into the pilot combustion channel defines the second supply opening for discharging the fuel gas into the air inlet duct and the wall portion of the air inlet duct formed inside the distributing member defines the receiving opening opposing to the second supply opening via the air inlet duct, to which opening the discharge of the fuel gas is directed. And, this receiving opening is connected via the communication line with the first supply opening defined in the outer surface of the distributing member.

That is, the fuel gas supplied to the supply line inside the distributing member is discharged from the second supply opening toward the receiving opening of the air inlet duct.

And, in the gas supply area where the discharged fuel gas is present in the air inlet duct inside the distributing member, a portion of the fuel gas transversing the air inlet duct is carried way by the air current of the air inlet duct to flow to the pilot combustion channel, while the rest of the gas flows through the air current of the air inlet duct to reach the first supply opening via the receiving opening to be supplied to the main combustion channel eventually.

More particularly, of the fuel gas discharged from the second supply opening into the air inlet duct, the fuel gas portion introduced into the communication line via the receiving opening will be guided to the first supply opening to be supplied to the main combustion channel. whereas, the other fuel gas portion not introduced into the receiving opening will be supplied via the air inlet duct to the pilot combustion channel. And, the greater the amount and the greater the speed of the supply of the fuel gas discharged from the second supply opening, the higher the ratio of the portion of the discharged fuel gas introduced into the receiving opening. As a result, the greater the supply amount of the fuel gas, the higher the distribution ratio of the fuel gas to the side of the first supply opening, i.e. to the side of the main combustion channel. Conversely, the smaller the amount of the supply of the fuel gas, the lower the distribution ratio of the fuel gas to the side of the main combustion channel.

Therefore, in the burner apparatus, the distributing means of the fluid distributor may be realized with a simple construction.

Further, the burner apparatus of the present invention, in addition to the burner apparatus construction described above, is characterized in further that the distributing member preferably comprises a plate-like member disposed within the main combustion channel with a plate face thereof being oriented along the flow direction of the oxygen-containing gas in the main combustion channel.

When the distributing member is provided within the main combustion channel as described above, this sometimes results in disturbance in the air flow inside the main combustion channel. However, by constructing this distributing member as a plate-like member having a plate face aligned in the air flow direction, such disturbance of the air in the main combustion channel can be minimized.

For accomplishing the above-noted object, a burner apparatus according to the present invention, includes a common channel formed at one end of the inner tube and the outer tube for supplying the oxygen-containing gas to the main combustion channel and the pilot combustion channel, a common supply opening for discharging the fuel gas of the gas channel in said common channel from the upstream side in the flow direction of the oxygen-containing gas of the pilot combustion channel to the upstream side in the flow direction of the oxygen-containing gas of the main combustion channel, and a common shielding member for adjusting the inflow amount of the oxygen-containing gas, for a common gas supply area which extends in a discharging direction of the fuel gas from the upstream side in the air flow direction of the common supply opening and from this common supply opening to the common channel.

Further, the burner apparatus of the present invention, in addition to the burner apparatus construction described above, is characterized in further that said first channel is used as the main combustion channel and said second channel is used as the pilot combustion channel.

That is to say, with the burner apparatus of the present invention, as in this construction, for example, the common channel is provided as a channel formed on the upstream side of the air flow of the inner tube and inside the outer tube, and the common supply opening is provided for causing the gas supplying means to discharge the fuel gas of the gas channel in the above-described direction to the common channel.

Namely, the fuel gas supplied to the gas channel will be discharged from the common supply opening provided in the common channel disposed on the upstream side of the pilot combustion channel toward the common channel disposed on the upstream side of the main combustion channel.

And, in the gas supply area where the discharged fuel gas is present in the common channel, a portion of the fuel gas transversing the common channel is carried way by the air current of the air introduced in the pilot combustion channel to flow to the pilot combustion channel, while the rest of the gas flows through the air current introduced in the pilot combustion channel to reach the air introduced in the main combustion channel to be supplied to the main combustion channel eventually.

Therefore, the greater the supply amount of the fuel gas to the gas channel and the greater the discharging speed of the fuel gas from the common supply opening to the common channel, the higher the ratio of the fuel gas reaching the common channel on the upstream side of the main combustion channel and flowing into the main combustion channel. As a result, by increasing the supply amount of the fuel gas, it is possible to increase the distribution ratio of the fuel gas to the main combustion channel. Conversely, by decreasing the supply amount of the fuel gas, it is possible to decrease the distribution ratio of the fuel gas to the main combustion channel.

Further, with the burner apparatus having this construction, the common shielding member is provided on the upstream side of the common supply opening of the common channel, so that it is possible to restrain the inflow of the air from the upstream side at least to the common gas supply area where the fuel gas discharged in the common channel on the upstream of the pilot combustion channel is present, thereby to appropriately adjust the inflow amount of the air to the common gas supply area. Hence, in the common gas supply area, the ratio of the fuel gas reaching the upstream of the main combustion channel and introduced therein may be adjusted appropriately, so that the distribution ratio of the fuel gas to the main combustion channel may be adjusted to suit the operation condition of the burner apparatus.

Further, as this common shielding member restrains the inflow of the air from the upstream side of the air from into the gas area, it is possible to increase the diameter of the common supply opening for reducing the discharging speed of the fuel gas, eventually reducing the pressure loss of the fuel gas at the common supply opening.

Therefore, it is not necessary to adjust the supply amount of the fuel gas to the pilot combustion channel and the supply amount of the fuel gas to the main combustion channel independently of each other. Rather, the distributing means may be constructed such that only with adjustment of the total supply amount of the fuel gas to the gas channel, the distribution ratio of the fuel gas to the main combustion channel and to the pilot combustion channel may be readily adjusted in accordance with e.g. combustion load variation. Moreover, the supply amount of the fuel gas to the pilot combustion channel may be increased in association with decrease in the total supply amount of the fuel gas at the time of low combustion load, thereby to assure stable pilot combustion. At the same time, the supply amount of the fuel gas to the main combustion channel may be increased in association with increase in the total supply amount of the fuel gas at the time of the rated combustion load, so that the fuel gas may be distributed uniformly to the main combustion channel and the pilot combustion channel to realize low NOx generation combustion with lean fuel-air mixture. Accordingly, there is achieved a burner apparatus which has a simple construction, but which achieves higher efficiency over wide combustion load range.

Further, in the burner apparatus of the present invention, of the outer first channel and the inner second channel, either combustion channel may be used as the main combustion channel. However, if the outer first channel is used as the main combustion channel and the inner second channel is used as the pilot combustion channel, at the time of low combustion load when the distribution ratio of the fuel gas for the pilot combustion channel is increased, more fuel gas will be introduced to the inner pilot combustion channel for assuring stable pilot combustion in the pilot combustion channel.

Also, the above-described burner apparatus of the present invention which achieves low NOx generation and high efficiency over a wide combustion load range can be used by itself as a burner apparatus for an incinerator for example. However, this apparatus is particularly useful as a burner apparatus for a gas turbine engine. Such gas turbine engine can operate over a wide operational load range while maintaining low NOx reduction and high efficiency.

Further, with a co-generation system including the gas turbine engine having the fluid distributor and the burner apparatus of the invention and a heat recovery device for recovering heat from exhaust gas, since the exhaust gas exhausted from the gas turbine engine has low NOx content, such device as a denitration device can be formed small or eliminated at all, so that cost reduction and size reduction of the system can be achieved.

BEST MODE OF EMBODYING THE INVENTION (First Embodiment)

A first embodiment of a burner apparatus relating to the present invention will be described below.

Figure 1:
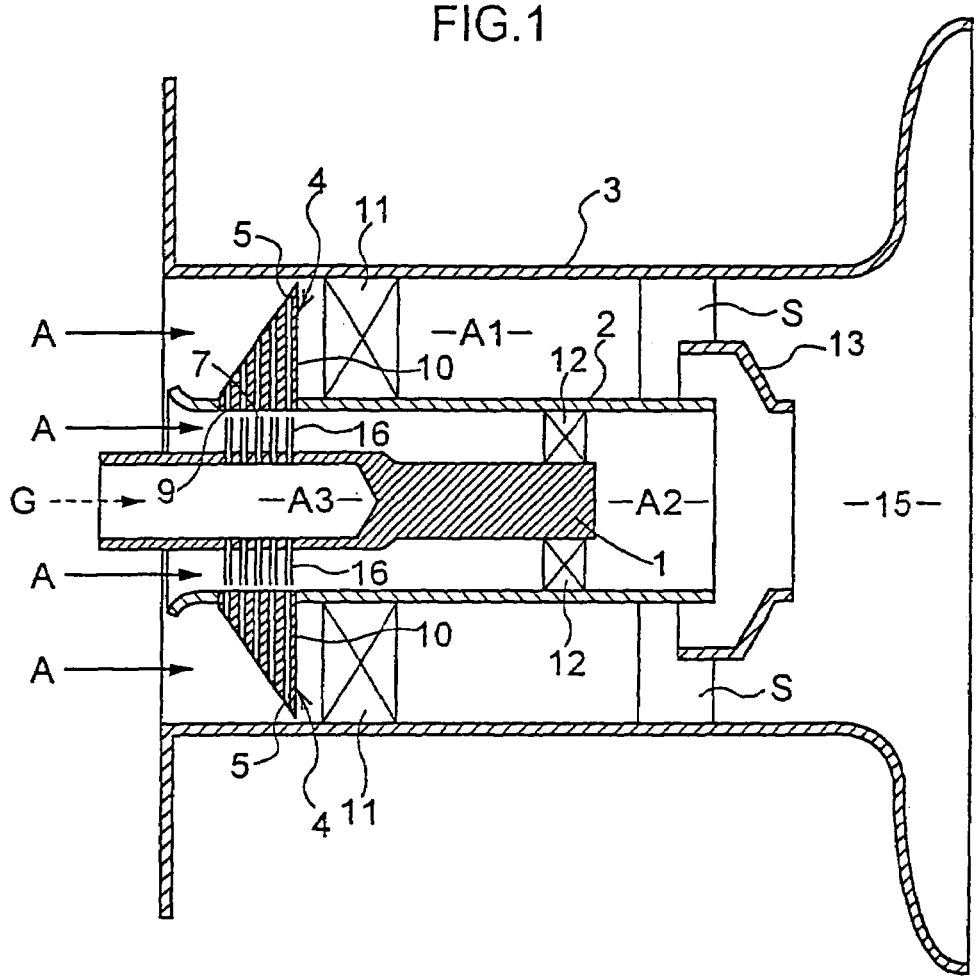
FIG. 1 is a side view in vertical section showing a first embodiment of a burner apparatus having fluid distributors according to the present invention.
Figure 2:
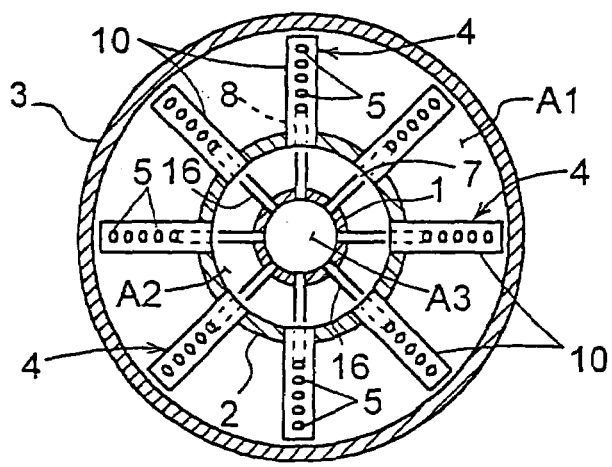
FIG. 2 is a front view in section of the burner apparatus shown in FIG. 1.

A burner apparatus for use in a gas turbine engine, an incinerator, etc., as shown in FIG. 1 and FIG. 2, includes a gas tube 1 defining a gas channel A3, an inner tube 2 defining a second channel A2 as a pilot combustion channel surrounding the gas tube 1, an outer tube 3 defining a first channel A1 as a main combustion channel surrounding the inner tube 2, an air supplying means (an example of "oxy-gen-containing gas supplying means") for supplying air A (an example of "oxygen-containing gas") as a first fluid to the first channel A1 and the second channel A2, and a gas supplying means for supplying fuel gas G as a second fluid to the first channel A1 and the second channel A2. In operation, the fuel gas G and the combustion air A are supplied to the main combustion channel and the pilot combustion channel to be mixed in the channels to provide a fuel-air mixture, which is combusted in a combustion chamber 15.

The gas tube 1, the inner tube 2 and the outer tube 3 are disposed coaxially. That is, the first channel A1, the second channel A2 and the gas channel A3 are juxtaposed.

The air supplying means is a means for forcing the air A into the first channel A1 and the second channel A2 from one end thereof by means of an unillustrated compressor, blower, etc.

The gas supplying means is a means for supplying the fuel gas G from an unillustrated gas supply source storing the fuel gas G therein via an unillustrated duct to the gas channel A3 and for distributing the fuel gas G inside this gas channel A3 to the first channel A1 and to the second channel A2. That is to say, the means is provided for supplying the fuel gas G to the gas channel A3 and distributing means is provided for distributing the fuel gas G inside this gas channel A3 to the first channel A1 and to the second channel A2.

The distributing means comprises a plurality of fluid distributors 4 distributed in the peripheral direction across the three channels of the first channel A1, the second channel A2 and the gas channel A3 for distributing the fuel gas G inside the gas channel A3 to the first channel A1 and to the second channel A2.

Figure 3:
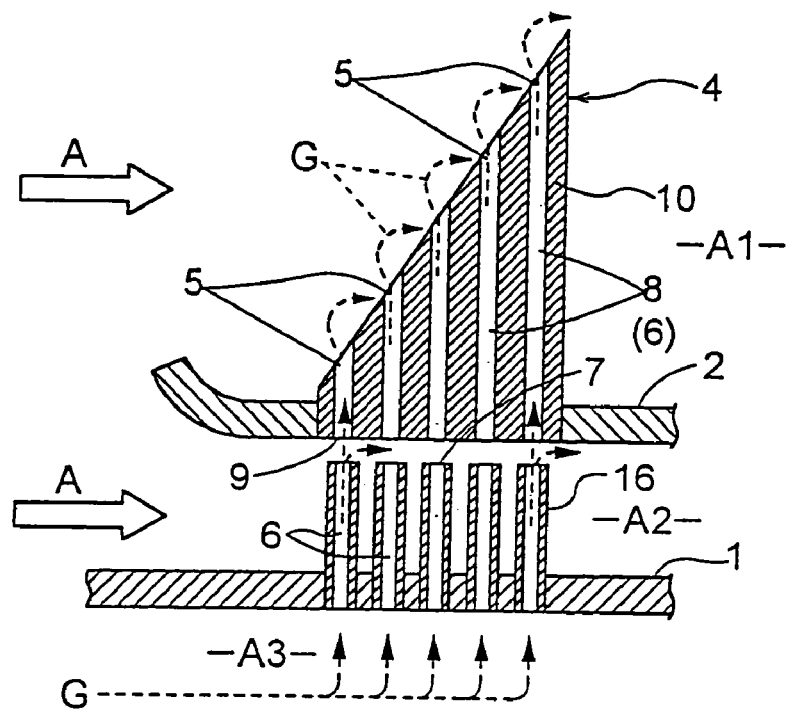
FIG. 3 is a side view in vertical section showing principal portion of the fluid distributors shown in FIG. 1.
Figure 4:
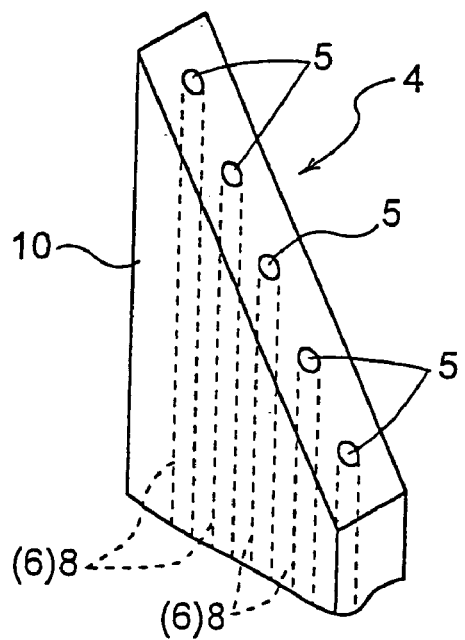
FIG. 4 is a perspective view showing the principal portion of the fluid distributors shown in FIG. 3.

Each fluid distributor 4, as shown in FIG. 3 and FIG. 4, includes a plurality of first supply openings 5 for supplying the fuel gas G into the first channel A1 and supply lines 6 for supplying the fuel gas G in the gas channel A3 to the respective first supply openings 5 independently of each other, each supply line 6 including distributing means for distributing the fuel gas G into the first channel A2 in such a manner that the distribution ratio of the fuel gas G to the first supply openings 5 is increased in association with increase in the supply amount of the fuel gas G from the gas channel A3 to the first channel A1 and the second channel A2, and conversely the distribution ratio of the fuel gas to the first supply openings 5 is decreased in association with decrease in the total supply amount of the fuel gas G.

Referring to the distributing means, each supply line 6 includes a nozzle 16 having a second supply opening 7 for discharging the fuel gas G into the second channel A2 from the gas channel A3 in a direction normal to the direction of the air A inside this second channel A2, a communication line 8 for receiving the discharged fuel gas G from this second supply opening 7 and guiding it to the first supply openings 5, and a receiving opening 9 for the communication line 8 formed at a position opposing to the second supply opening 7 and spaced apart therefrom with a predetermined distance, the receiving opening being open to the second supply opening 7.

The plurality of first supply openings 5 of each fluid distributor 4 are formed on an end face of plate-like member 10 which is disposed in the first channel A1 along the flow direction of the air A, with the openings being open in a same direction and spaced apart from each other with a predetermined distance along the flow direction of the air A, and the respective communication lines 8 of the supply lines 6 are formed inside the plate-like member 10.

The end face of the plate-like member 10 is disposed with such a posture that the face extends away from the side of the second channel A2 on the downstream side in the flow direction of the air A. That is to say, the plurality of first supply openings 5 of each fluid distributor 4 are open in the same direction in the upstream direction of the flow of the air A and are distributed along the width direction (radial direction) of the first channel A1 which is the direction distant from the second channel A2.

Therefore, when this fluid distributing means is in operation, as the supply amount of the fuel gas G inside the gas channel A3 is increased, the distribution ratio of the fuel gas G to the side of the first supply openings 5 will be increased, thereby to supply a greater amount of the fuel gas G to the first channel A1. And, as a plurality of the fluid distributors 4 are distributed along the peripheral direction and the first supply openings 5 of each fluid distributor 4 are distributed along the width direction of the first channel A1, the fuel gas G may be supplied in diffusion in the first channel A1 in the width direction and the peripheral direction of the first channel A1.

Further, since the first supply openings 5 are formed in the end face of the plate-like member 10 opposing to the upstream side of the flow of the air A, the fuel gas G supplied from the first supply openings 5 into the first channel A1 will be caused to collide against this end face by the current of the air A, thereby to achieve uniform mixing in the first channel A1.

And, at a portion of the first channel A1 downstream of the fluid distributors 4, there is provided a first swirler 11 for providing a swirling force to the fuel-air mixture of the air A and the fuel gas G.

At an intermediate portion of the second channel A2 in the flow direction, there is provided a second swirler 12 for providing a swirling force to the fuel-air mixture of the air A and the fuel gas G introduced into this second channel A2.

With these swirlers 11, 12, it is possible to improve the flame stability of the main combustion by the flame of the pilot combustion. Namely, when the fuel-air mixture mixed concurrently with the application of the swirling force from the second swirler 12 is ignited by an unillustrated ignition device, this fuel-air mixture will be ignited to provide a pilot combustion. And, as the flame of this pilot combustion ignites the fuel-air mixture having flown through the first channel A1, the fuel-air mixture is combusted to provide a main combustion.

Further, adjacent the downstream end of the inner tube 2, there is provided an air stage ring 13 for combing and mixing a portion of the fuel-air mixture having flown through the first channel A1 with the fuel-air mixture having flown through the second channel A2.

Reference mark S in the drawing denotes struts distributed along the peripheral direction for supporting the inner tube 2 to the outer tube 3.

Further, the nozzle 16 is a tubular member surrounding a radial portion of a second gas supply area in the second channel A2 where the fuel gas G is discharged from the second supply opening 7 of the supply line 6 to the receiving opening 9. And, this nozzle functions as a second shielding member for restraining inflow of the air A from the upstream side of the flow of the air A into the second gas supply area, thereby appropriately adjusting the inflow amount of the air A.

That is to say, in the second channel A2, between the end of the nozzle 16 and the receiving opening 9, there is formed a slit-like gap where the fuel gas G discharged into the second channel A2 is exposed to the flow of the air A. Then, by appropriately adjusting the width of this slit-like gap by adjusting the height of the nozzle, the ratio of the fuel gas G flowing through the air A introduced into this slit-like gap to reach and enter the receiving opening 9 can be adjusted appropriately, so that the distribution ratio of the fuel gas to the first channel A1 may be adjusted to suit the operation condition of the burner apparatus.

Therefore, the distribution ratio of the fuel gas G to the first channel A1 and to the second channel A2 may be readily adjusted in association with e.g. variation of the combustion load.

Further, as the nozzle 16 restrains the inflow of the air A into the second gas supply area where the fuel gas G of the second channel A2 is discharged, by increasing the diameter of the supply line 6 to reduce the discharging speed of the fuel gas G, pressure loss of the fuel gas at the gas supplying means can be reduced advantageously.

Also, as the nozzle 16, instead of the cylindrical member, a tubular member of any shape such as an oval or oblong tubular shape or of a semicircular, semi-oval, triangular or rectangular shape may be used also.

Further, instead of this nozzle 16, it is possible to employ also, as a member extending over at least a portion of the upstream side of the flow of air A of the second gas supply area, a plate-like member which extends from the gas tube 1 on the upstream side of the flow of the air A of the second supply opening 7 toward the inner tube 2 and which has a plate face extending normal to the axial direction which is the flow direction of the air A, or a plate-like member having a plate face inclined relative to the direction normal to the flow of the air A, or a curved or bent plate-like member in the form of a split tubular member slip along the direction of the tube axis, having a cross section extending toward the inner tube 2 in the form of an arc, an oval arc, u-shaped or v-shaped surrounding at least the upstream side of the second supply opening 7.

Also, when such plate-like member is provided, it is also possible to define a plurality of openings in this plate-like member for adjusting the inflow amount or the distribution of the air A as the inflow condition of the air A into the gas area. Further, the shape of each of these openings may be circular, semi-circular, oval, semi-oval, slit-like, or other polygonal shape. And, this shape may be determined with consideration of the cost and performance, etc.

Further, in the foregoing, the discharging direction of the fuel gas G from the second supply opening 7 is set so that the fuel gas G is discharged from the gas channel A3 in the direction normal to the flow direction of the air A inside this second channel A2. However, this discharging direction is not particularly limited in the present invention. Preferably, the second supply opening 7 is constructed so that the fuel gas G may be discharged into the second channel A2 within a range from a direction inclined by 20° toward the receiving opening 9 relative to the flow direction of the air A inside the second channel A2 to a direction inclined by 20° toward the receiving opening 9 relative to the opposite direction to the flow of the air A.

(Second Embodiment)

A second embodiment in which the fluid distributor 4 is different from the above-described embodiment will be described next.

Figure 5:
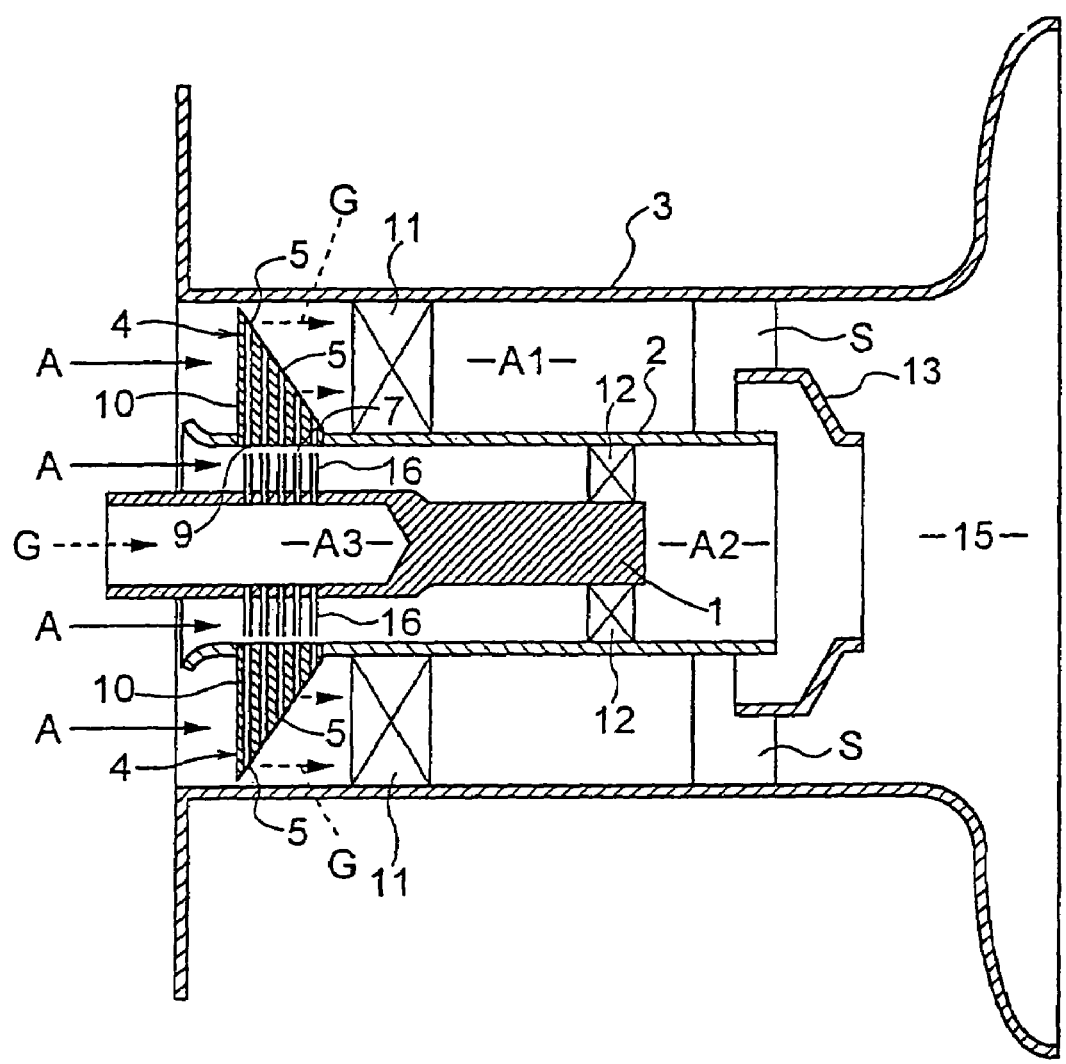
FIG. 5 is a side view in vertical section showing a second embodiment of a burner apparatus having fluid distributors according to the present invention.

In the case of the burner apparatus of the first embodiment, the first supply openings 5 are formed in the end face of the plate-like member 10 opposing to the upstream side of the flow of the air A, so as to improve the uniform mixing of the fuel gas G in the first channel A1. Alternatively, instead of disposing the end face defining the first supply openings 5 of the plate-like member 10 with the posture of the face departing from the second channel A2 on the downstream side of the flow direction of the air A, a construction shown in FIG. 5 is also possible. In this case, on the contrary to the first embodiment, the first supply openings 5 are formed in an end face of the plate-like member 10 opposing to the flow of the air A, with the end face being oriented with a posture of the face approaching the second channel A2 on the downstream side of the flow direction of the air A.

With this construction too, the object of the invention may be achieved such that the fuel gas G is supplied with a predetermined distribution ratio between the first channel A1 and the second channel A2 with the supply amount adjustment of the fuel gas G inside the gas channel A3.

(Third Embodiment)

Next, a third embodiment different from the first and second embodiments will be described with reference to FIGS. 6 through 8.

Figure 6:
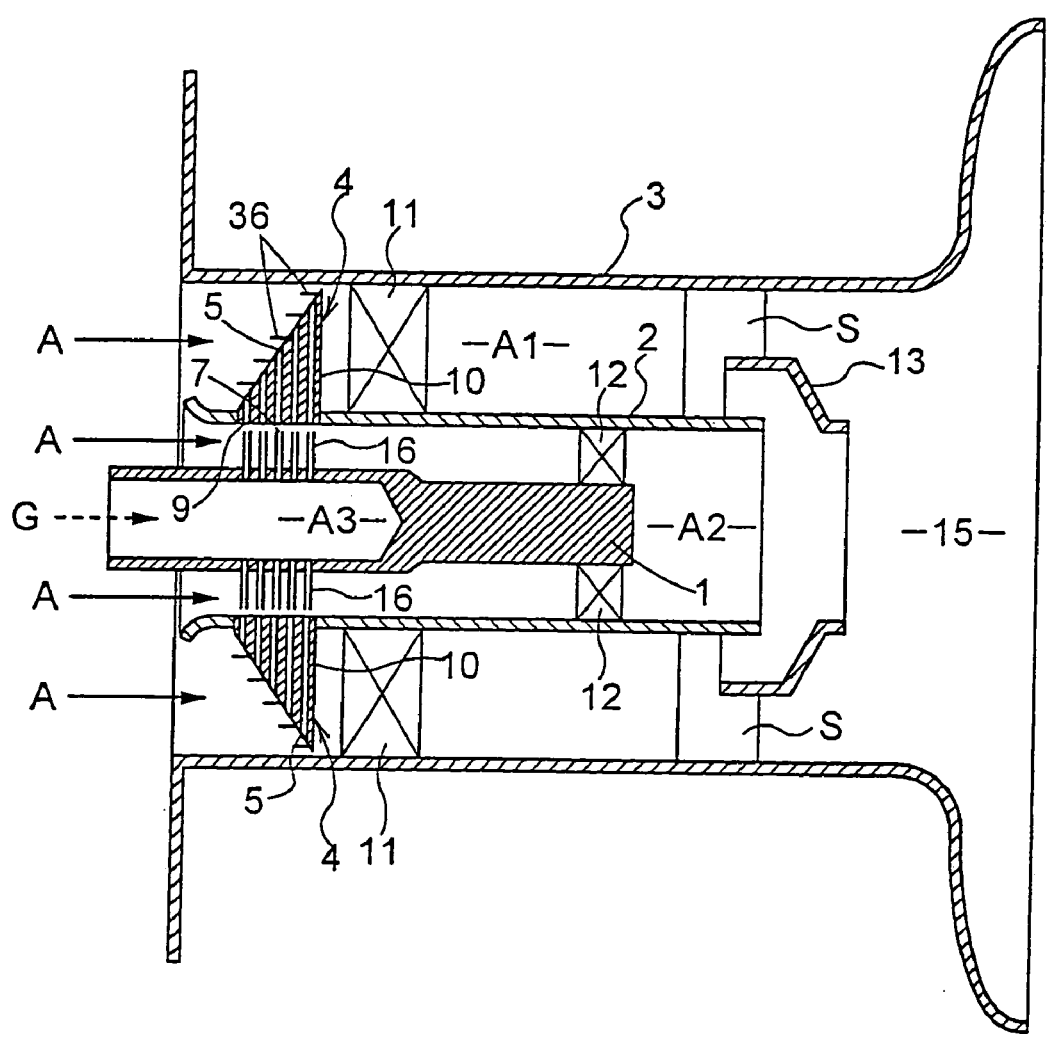
FIG. 6 is a side view in vertical section showing a third embodiment of a burner apparatus having fluid distributors according to the present invention.
Figure 7:
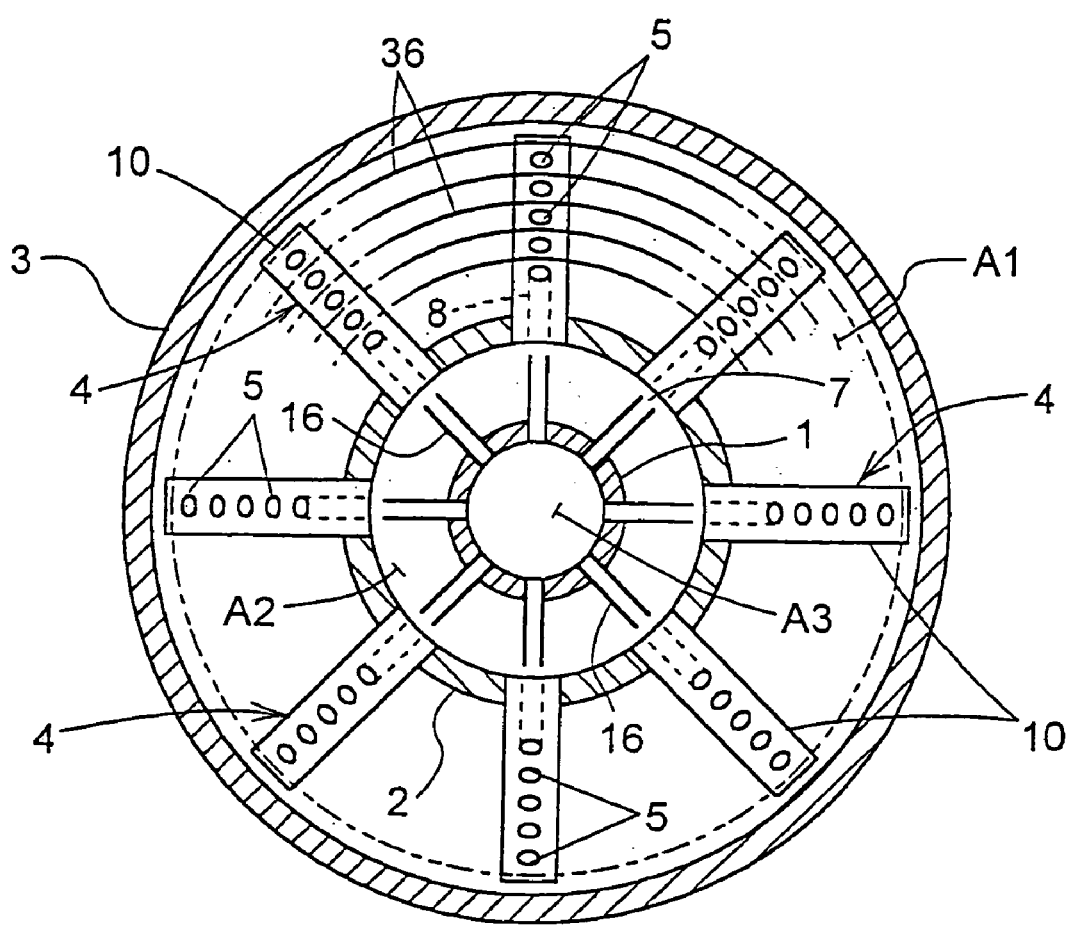
FIG. 7 is a front view in section of the burner apparatus shown in FIG. 6.

A burner apparatus shown in FIG. 6 and FIG. 7 includes, in addition to the burner apparatus construction of the first embodiment shown in FIG. 1 and FIG. 2, five mixing promoting members 36 against which the fuel gas G discharged from the first supply openings 5 of the fluid distributors 4 is caused to collide in the direction away from the inner tube 2, so that the collided gas G is diffused in the first channel A1 as the main combustion channel. Further, these mixing promoting members 36 are ring-like members disposed in distribution along the peripheral direction of the first channel A1 and having plate faces along the discharging direction of the fuel gas G from the plurality of first supply openings 5 which are distributed in the peripheral direction and equidistantly spaced apart from the inner tube 2.

With provision of such mixing promoting members 36, it is possible to cause the fuel gas G discharged from the first supply openings 5 to collide against these mixing promoting members 36 to be diffused thereby, so that the fuel gas G may be supplied uniformly relative to the air a in the first channel A1.

Also, as the mixing promoting members 36 are ring-like members disposed along the peripheral direction of the first channel A1, by causing the fuel gas G discharged from the plurality of first supply openings 5 provided in the peripheral direction to collide the plate faces of these ring-like mixing promoting members 36, the fuel gas G may be diffused at least in the peripheral direction of the first channel A1.

And, by providing the mixing promoting members 36 in the first channel A1, the fuel gas G may be supplied uniformly into the first channel A1, without significant pressure loss. And, with the reduction of pressure loss at the first supply opening 5, the distributing means allows the fuel gas G discharged from the second supply opening 7 into the second channel A2 to be received efficiently into the receiving openings 7.

Figure 8:
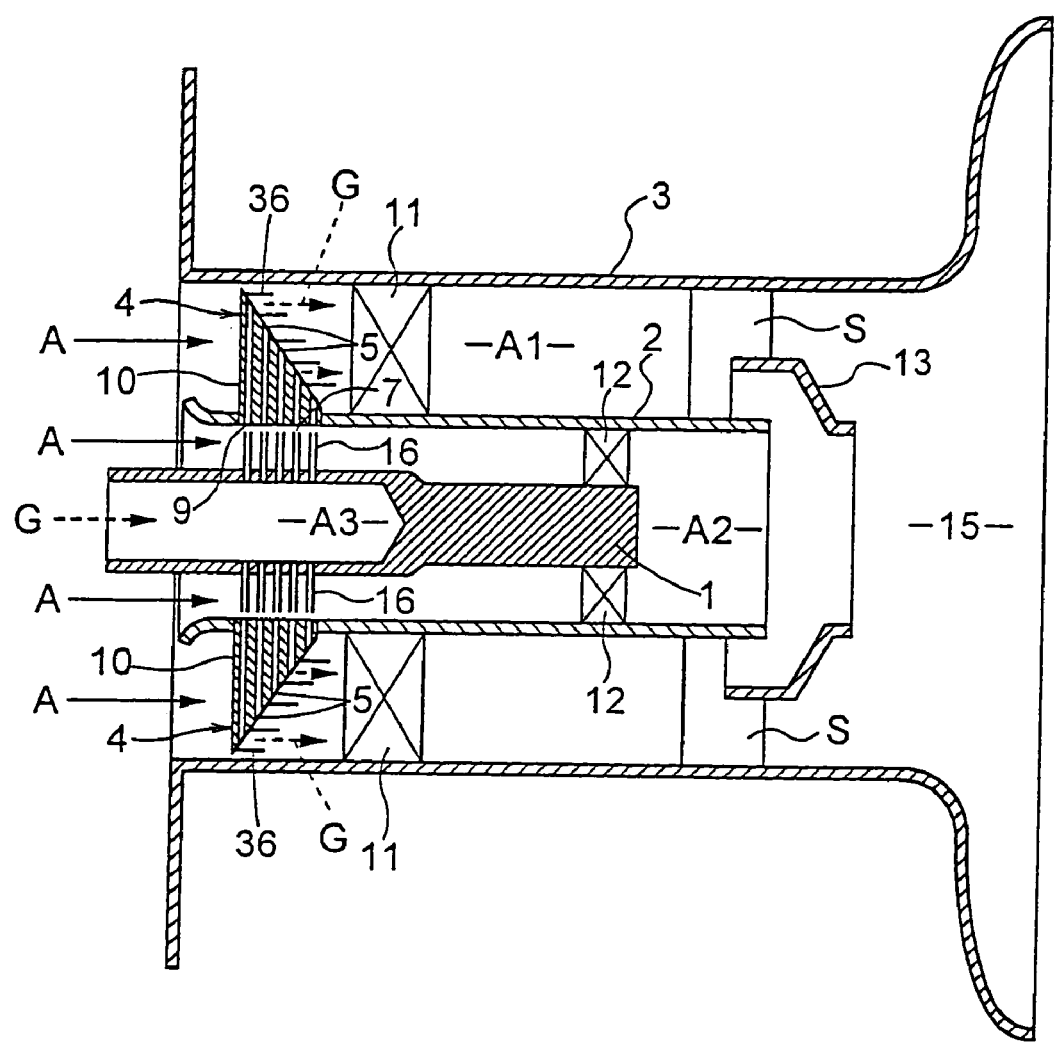
FIG. 8 is a side view in vertical section showing a burner apparatus according to a modified mode of the third embodiment.
Figure 9:
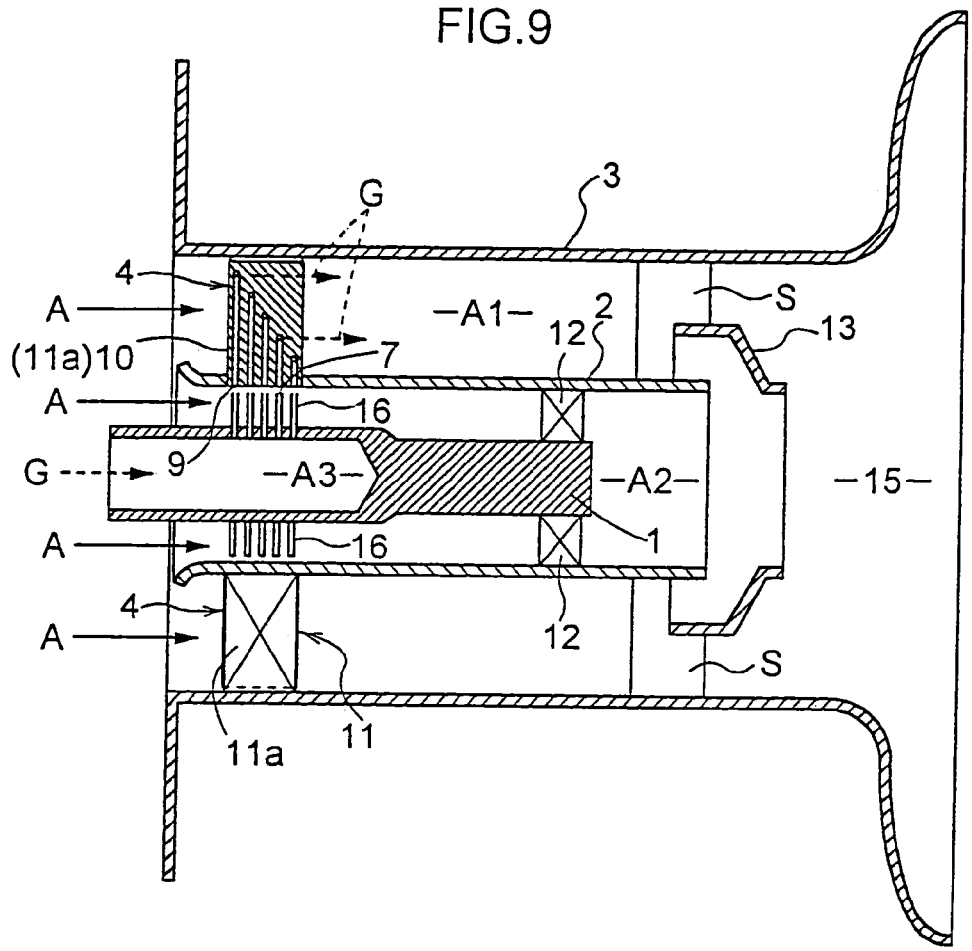
FIG. 9 is a side view in vertical section showing a fourth embodiment of a burner apparatus having fluid distributors according to the present invention.
Figure 10:
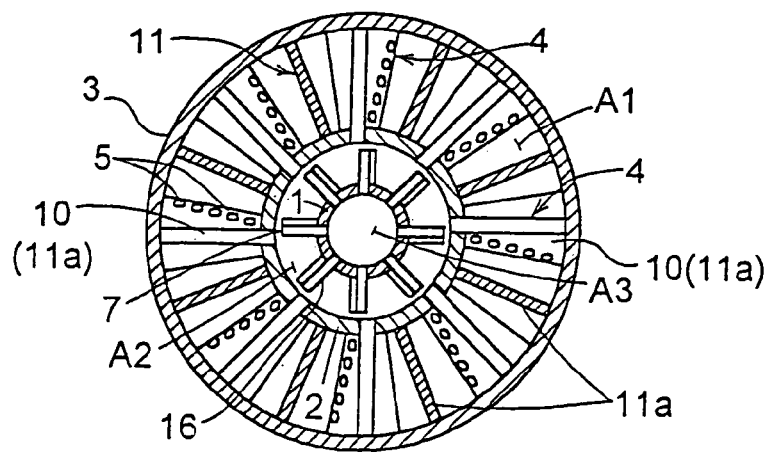
FIG. 10 is a front view in section of the burner apparatus shown in FIG. 9.
Figure 11:
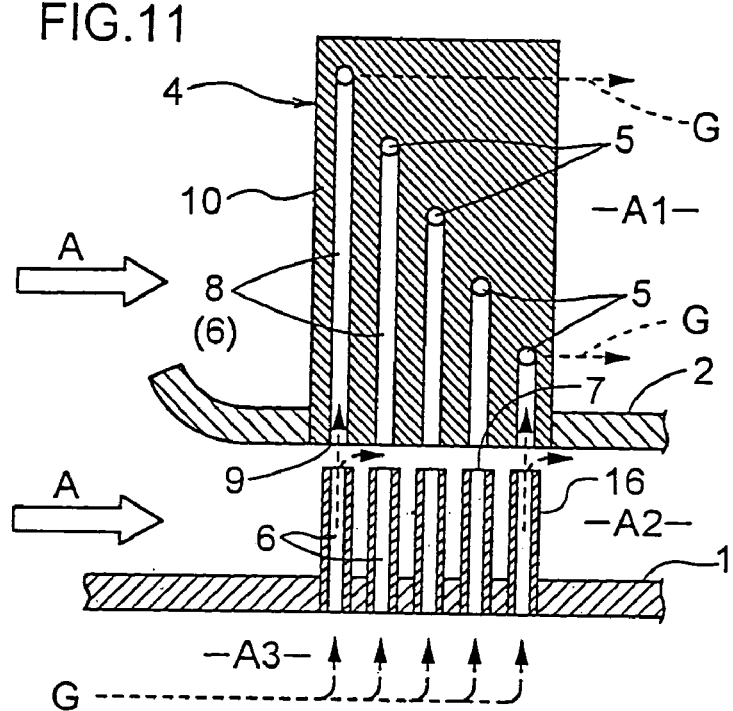
FIG. 11 is a side view in vertical section showing principal portion of the fluid distributors shown in FIG. 10.
Figure 12:
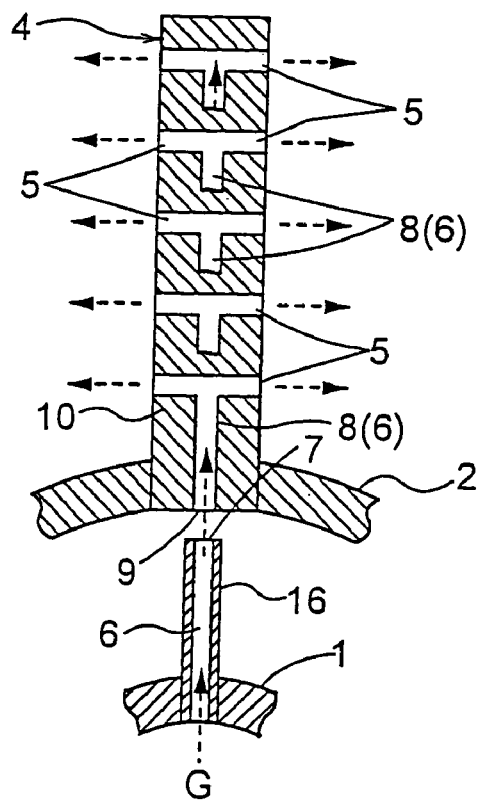
FIG. 12 is a front view in section showing the principal portion of the fluid distributors shown in FIG. 10.

Further, as shown in FIG. 8, the ring-like mixing promoting members 36 can be provided also in the burner apparatus of FIG. 5 relating to the second embodiment.

Incidentally, the ring-like mixing promoting members 36 may be provided intermittently for the plurality of first supply openings 5. That is, the mixing promoting member 36 may be provided as a ring-like member having a plate face only in the vicinity of the first supply openings 5. Further, e.g. the shape of each plate face may be a shape designed in consideration to the diffusion condition of the fuel gas. Further, the shape need not be the same in the peripheral direction.

(Fourth Embodiment)

Next, a fourth embodiment in which the fluid distributor 4 is different from those of the foregoing embodiments will be described.

As shown in FIGS. 9 through 12, in this case, the first supply openings 5 are not formed in an end face of the plate-like member 10. Rather, in one of the two plate faces, there are formed a plurality of first supply openings 5 for discharging the fuel gas G in the direction normal to the plate face, with the openings being distributed in the width direction of the first channel A1 and the flow direction of the air A; and in the other plate face too at its each position opposing to each said first supply opening 5 in the plate thickness direction, there is formed a first supply opening 5 for discharging the fuel gas G in the direction normal to the plate face. And, in the plate-like member 10, there are formed a plurality of supply lines 6 (communication lines 8) for guiding the fuel gas G from the gas channel A3 to the plurality of first supply openings 5 independently of each other, with one supply line 6 being provided for each two first supply openings 5 opposed to each other equidistantly from the second channel A2.

And, a plurality of the plate-like members 10 are arranged with the respective plate faces thereof being aligned with the spiral direction of the first channel A1, and of the fins 1a of the swirler 11 for providing a swirling force to the air A supplied to the first channel A1, those disposed alternately in the peripheral direction are constituted from the plate-like members 10.

(Fifth Embodiment)

A fifth embodiment of the burner apparatus of the invention will be described next with reference to FIGS. 13 through 15.

Figure 13:
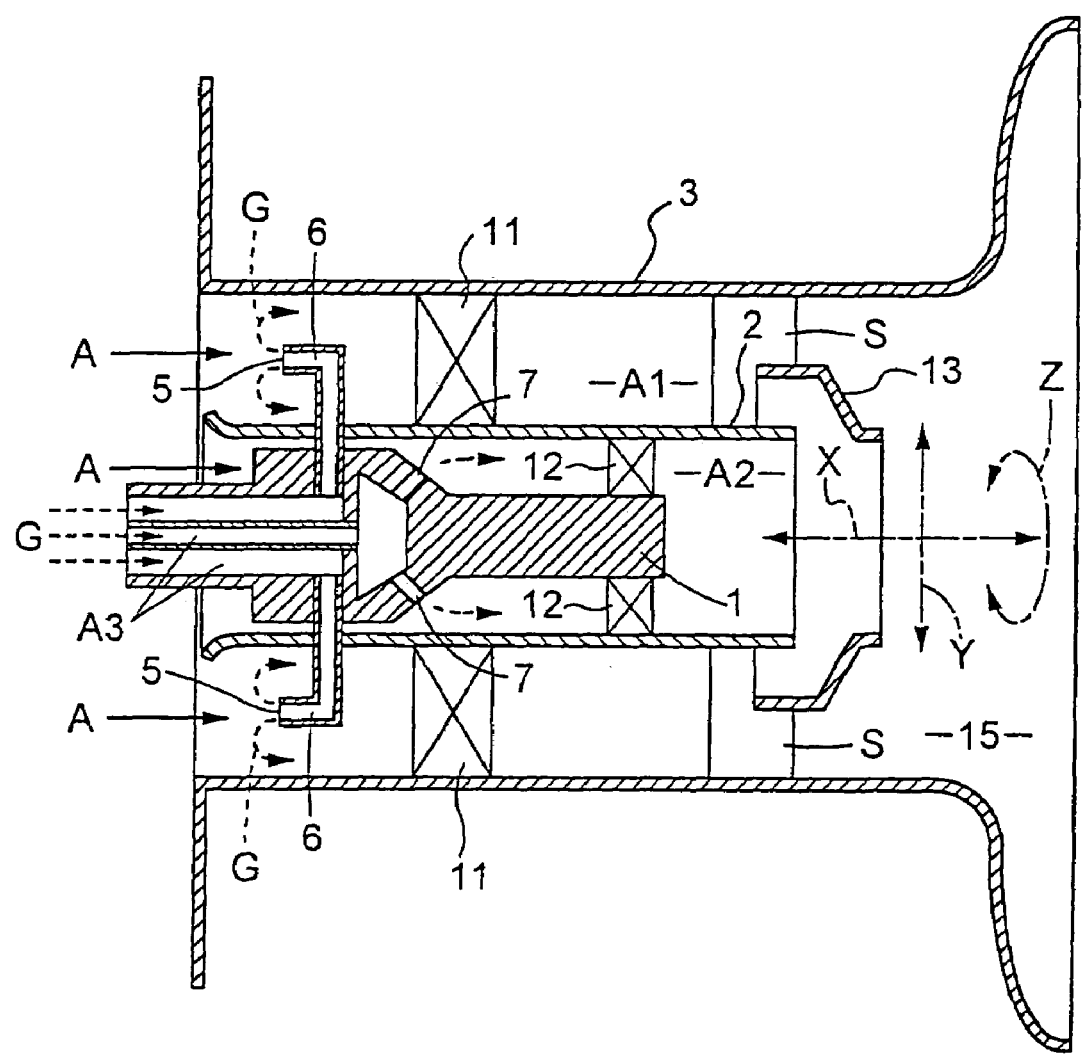
FIG. 13 is a side view in vertical section showing a fifth embodiment of a burner apparatus having fluid distributors according to the present invention.

With the burner apparatus shown in FIG. 13, as the gas supplying means, instead of the fluid distributors 4 of the foregoing embodiments, of two gas channels A3, one gas channel A3 is communicated with the second supply opening 7 for supplying the fuel gas G to the second channel A2 and the other is communicated via the supply line 6 with the first supply opening 5 for supplying the fuel gas G to the first channel A1. And, with this construction too, by the adjustment of the supply amount of the fuel gas G to the two gas channels A3, the fuel gas G may be supplied by a predetermined distribution ratio to the first channel A1 as the main combustion channel and to the second channel A2 as the pilot combustion channel.

And, in this embodiment, the first supply opening 5 is formed so as to discharge the fuel gas G to more upstream side in the flow direction X of the air A than the direction normal to the flow direction X of the air A in the first channel A1. To this end, in the embodiment, the end of the supply line 6 is bent in a predetermined direction.

More particularly, in the present embodiment, the first supply opening 5 with 180 degrees in opposition to the flow direction of the air A. In this case, it is possible to maximize the relative speed between the air A and the fuel gas G, thus enhancing the mixing degree of the fuel gas.

Incidentally, the opening direction of the first supply opening 5 need not be opposite to the air A as described above. Preferably, the direction should be set within a range of 80 degrees from the upstream side relative to the flow direction X of the air A. In this case too, the relative speed between the air A and the fuel gas G may be set relatively large, whereby fuel-gas mixture having good mixing degree may be obtained.

As described above, with the burner apparatus of the present invention, it is not necessary to provide a plurality of small-diameter discharge openings in the radial direction Y of the first channel A1 for one supply line 6. That is, it is not necessary to increase the supplying pressure of the gas supplying means. As a result, since the fuel gas G may be discharged with such a pressure just enough to overcome the pressure of the air A, the discharging pressure or the discharging speed of the fuel gas G may be reduced, whereby pressure loss during the supply of the fuel gas G may be reduced advantageously.

A combustion evaluation test was conducted with using the burner apparatus shown in FIG. 13, with a test pressure of 119 kPa (abs) (1.21 kgf/cm$^2$ (abs)). In this test, in order to confirm the pressure-loss reduction effect relating to the supply of the fuel gas G to the first channel A1 and the NOx reduction effect due to the uniform mixing in the first channel A1, the burner apparatus shown in FIG. 13 was employed so that the first supply openings 5 and the gas channel A3 were directly coupled with each other so that the fuel gas G was supplied to the first supply openings 5 and the supply of the fuel gas G to the second channel A2 was effected separately. Incidentally, the first supply opening 5 had an inner diameter of 2.6 mm φ and the fuel gas G was supplied from eight first supply openings 5 to the first channel A1.

The result showed a NOx generation amount less than 10 ppm as measured with 0% oxide and the combustion efficiency of 99% or more and the maximum pressure loss in the fuel supply to the first channel A1 being 56 kPa (0.57 kgf/cm$^2$).

Figure 44:
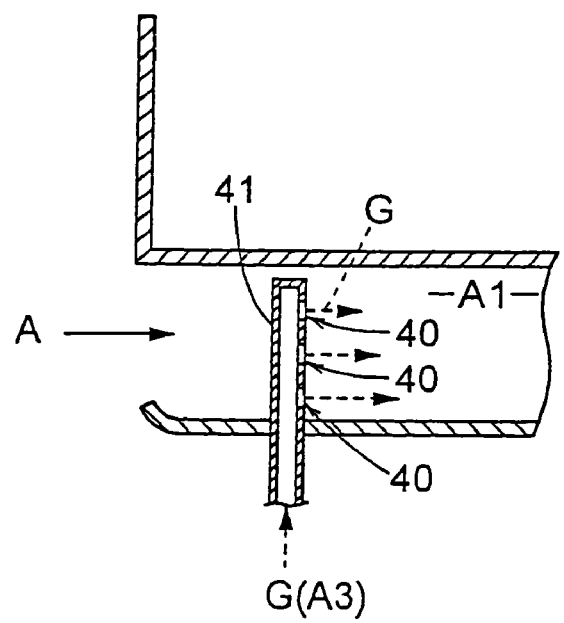
FIG. 44 is a partial section showing a conventional burner apparatus as a comparison example.

In the case of a burner apparatus shown in FIG. 44 as a comparison example, in this case too, as eight tube forming members 41 are provided along the peripheral direction of the first channel A1, there are 24 of discharge openings 30 in total. The inner diameter of each discharge opening is 0.7 mm φ.

In the case of the burner apparatus of FIG. 44, the NOx generation amount was less than 13 ppm as measured with 0% oxide and its combustion efficiency was more than 99%. However, the maximum pressure loss in the fuel supply to the first channel A1 was 250 kPa (2.55 kg/cm$^2$), which is significantly greater than the burner apparatus of FIG. 13. This shows that the burner apparatus according to the present invention achieves the pressure-loss reduction effect while maintaining uniform mixing.

The conditions employed in the above-described combustion evaluation test were 350° C. for the temperature of air A, 0.35 equivalent ratio of the fuel gas G relative to the air A, 2.6 m$^3$/h (Normal) for the fuel supply amount to the second channel A2, 23.6 m$^3$/h (Normal) for the fuel supply amount to the first channel A1, and 1000° C. for TIT (average temperature at the exit of combustor (entrance to the turbine)).

Next, there will be described a case using such gas supplying means in combination with the fluid distributor.

Figure 14:
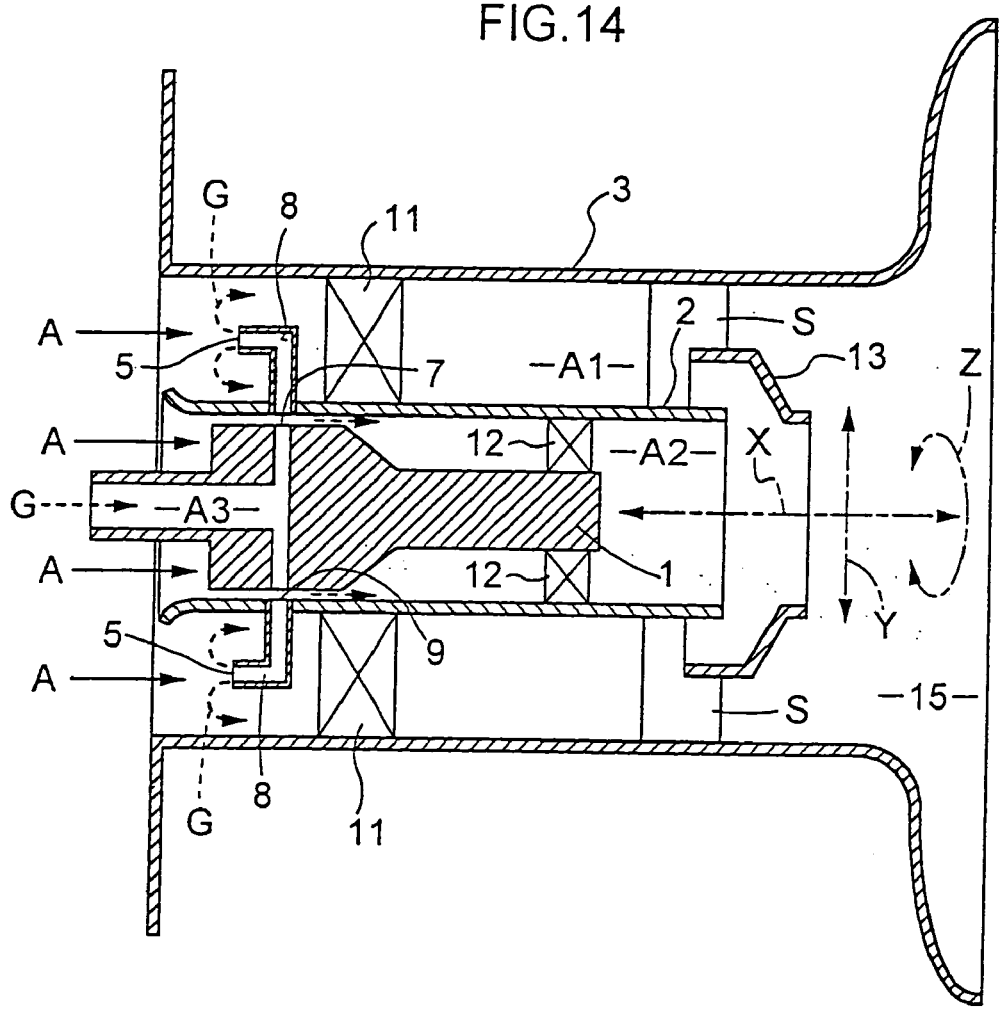
FIG. 14 is a side view in vertical section showing a modified mode of the burner apparatus shown in FIG. 13.

Namely, like the foregoing embodiment, a burner apparatus shown in FIG. 14 is constructed such that the fluid distributor 4 as the gas supplying means is adapted for receiving, from the second channel A2, at least a portion of the fuel gas G supplied from the second supply opening to the second channel A2 and then supplying it to the first channel A1.

That is to say, like the foregoing embodiment, the single gas channel A3 is communicated only with the second supply opening 7. And, this second supply opening 7 is open into the second channel A2. The discharging direction of the fuel gas G from the second supply opening 7 is directed substantially normal to the flow direction of the air A.

And, at a position opposed to the second supply opening 7, the inner tube 2 defines the receiving opening 9 communicated with the first supply opening 5 provided in the first channel A1. For both the second supply opening 7 and the first supply opening 5, eight of them are disposed in distribution along the peripheral direction Z of the burner apparatus. Further, the position of the first supply opening 5 in the radial direction Y of the first channel A1 corresponds to the center of the width of the first channel A1.

Therefore, although this construction is very simple, it is possible to appropriate set the pilot combustion condition in the second channel A2 and the main combustion condition in the first channel A1.

Figure 15:
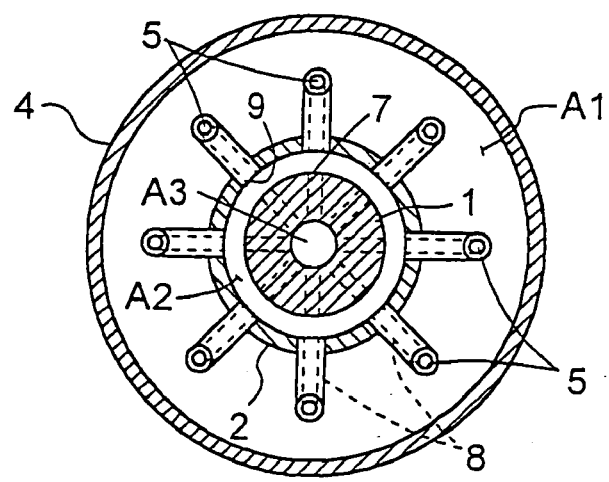
FIG. 15 is a front view in section of the burner apparatus shown in FIG. 14.

As shown in FIG. 15, in this embodiment, 8 (eight) supply lines 6 are equidistantly disposed along the peripheral direction Z of the first channel A1. In operation, the fuel gas G discharged from each supply line 6 is caused to collide the air A to be dispersed to the outer side from first supply opening 5 as the center. As a result, the fuel gas G may be dispersed and mixed substantially over the entire area of the first channel A1, thereby to achieve substantially constant equivalent ratio of the fuel-air mixture.

(Sixth Embodiment)

Next, a further sixth embodiment relating to the fifth embodiment will be described with reference to FIGS. 16–18.

Figure 16:
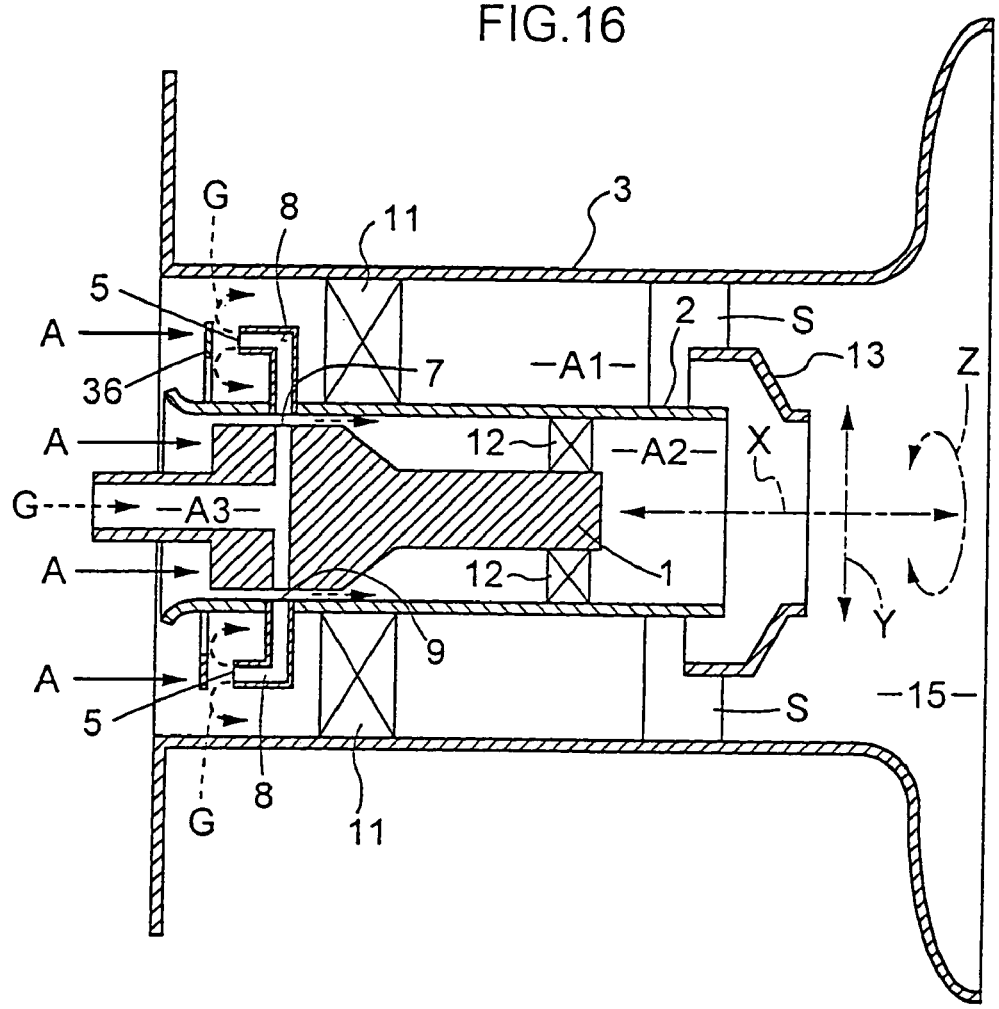
FIG. 16 is a side view in vertical section showing a sixth embodiment of a burner apparatus having fluid distributors according to the present invention.
Figure 17:
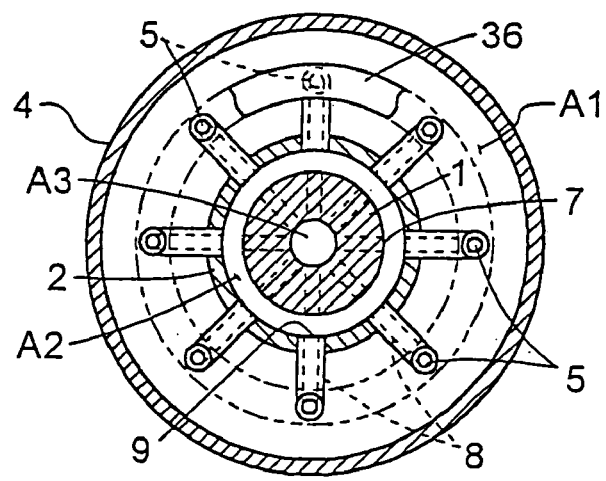
FIG. 17 is a front view in section of the burner apparatus shown in FIG. 16.

The burner apparatus shown in FIGS. 16 and 17, in addition to the burner apparatus construction relating to the fifth embodiment shown in FIGS. 14 and 15, includes a mixing promoting member 36 against which the fuel gas G discharged from the first supply opening 5 of the fluid distributor 4 collides in the direction opposite to the flow direction of the air A in the first channel A1 to be dispersed in the first channel A1 functioning as the main combustion channel. This mixing promoting member 36 is a ring-like member extending along the peripheral direction of the first channel A1 and having a plate face oriented along the discharging direction of the fuel gas G from the plurality of first supply openings 5.

With provision of such mixing promoting member 36, it is possible to cause the fuel gas G discharged from the first supply openings 5 to collide this mixing promoting member 36 to be dispersed at least in the peripheral direction of the first channel A1, thereby to supply the fuel gas G uniformly to the air a in the first channel A1.

And, by providing the mixing promoting member 36 in the first channel A1, it is possible to supply the fuel gas G uniformly to the first channel, without involving significant pressure loss. The distributing means may be constructed such that the fuel gas G discharged from the second supply opening 7 into the second channel A2 may be effectively received by the receiving opening 9 thanks to the reduced pressure loss at the first supply openings 5.

Figure 18:
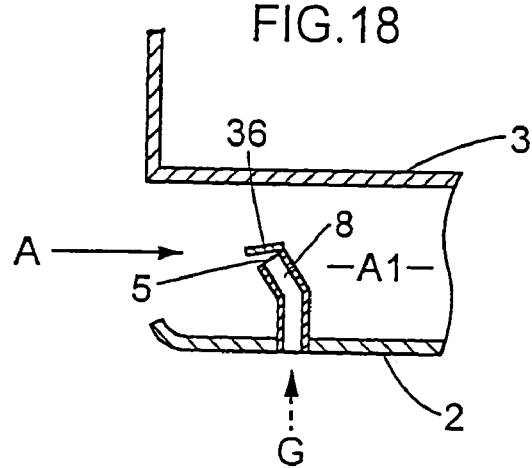
FIG. 18 is a partial side view in vertical section showing a modified mode of the burner apparatus shown in FIG. 16.

Further, as shown in FIG. 18, if the opening direction of the first supply opening 5 is set with an inclination relative to the opposite direction to the flow direction X of the air A, the ring-like mixing promoting member 36 may be provided with a plate face oriented toward the first supply opening 5 so as to allow the fuel gas G discharged from this first supply opening 5 to collide against the face.

Moreover, such mixing promoting member 36, in addition to the burner apparatus having the fluid distributor 4, may also be provided for the first supply opening 5 or the second supply opening 7 of the burner apparatus shown in FIG. 13.

(Seventh Embodiment)

Next, a further embodiment of the mixing promoting member will be described with reference to FIGS. 19–20.

Figure 19:
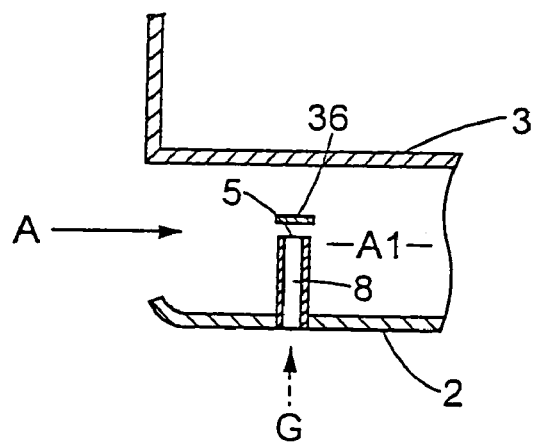
FIG. 19 is a side view in vertical section showing a seventh embodiment of a burner apparatus having fluid distributors according to the present invention.

In the case of the burner apparatus shown in FIG. 19, the opening direction of the first supply opening 5 for supplying the fuel gas to the first channel A1 is set to a direction away from the inner tube 2 extending normal to the flow direction of the air A of the first channel A1 toward the outer tube 3.

And, with this burner apparatus, it is possible to employ, as the mixing promoting member 36, a ring-like member which has a plate face extending away from the first supply opening 5 toward the outer tube 3 and which extends along the peripheral direction of the first channel A1. So that, the it becomes possible to cause the fuel gas G discharged from the first supply opening 5 to collide against the mixing promoting member 36, thus being dispersed at least along the peripheral direction of the first channel A1.

Figure 20:
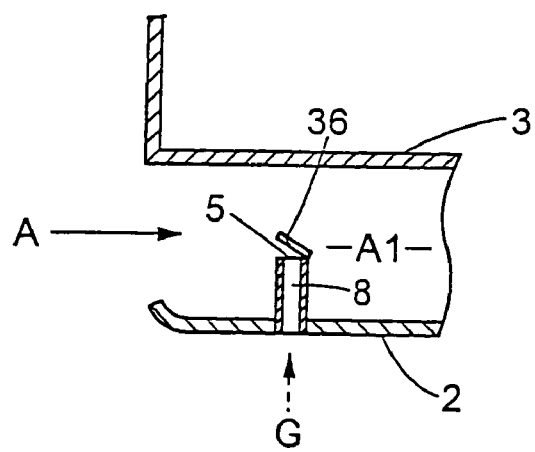
FIG. 20 is a partial side view in vertical section showing a modified mode of the burner apparatus shown in FIG. 19.
Figure 21:
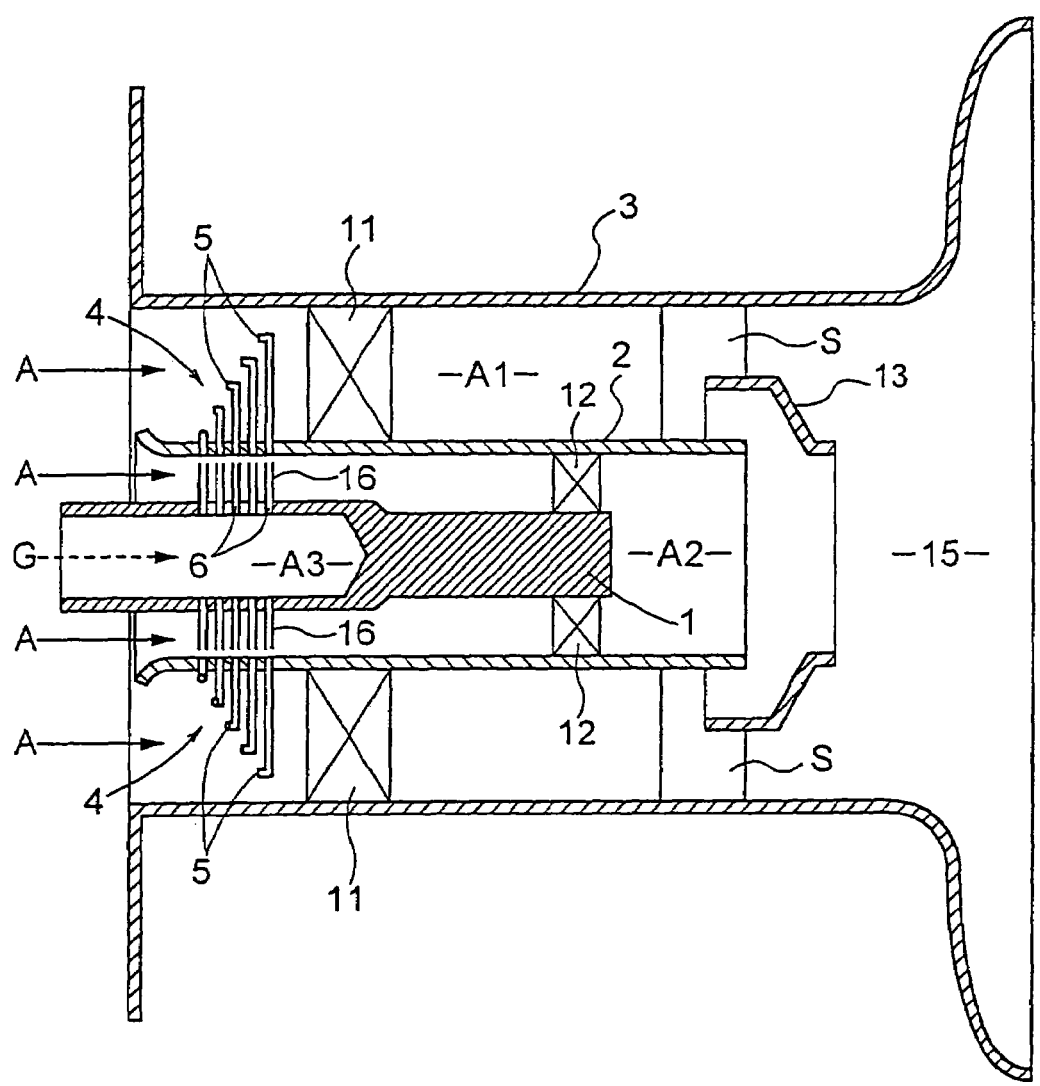
FIG. 21 is a side view in vertical section showing an eighth embodiment of a burner apparatus having fluid distributors according to the present invention.
Figure 22:
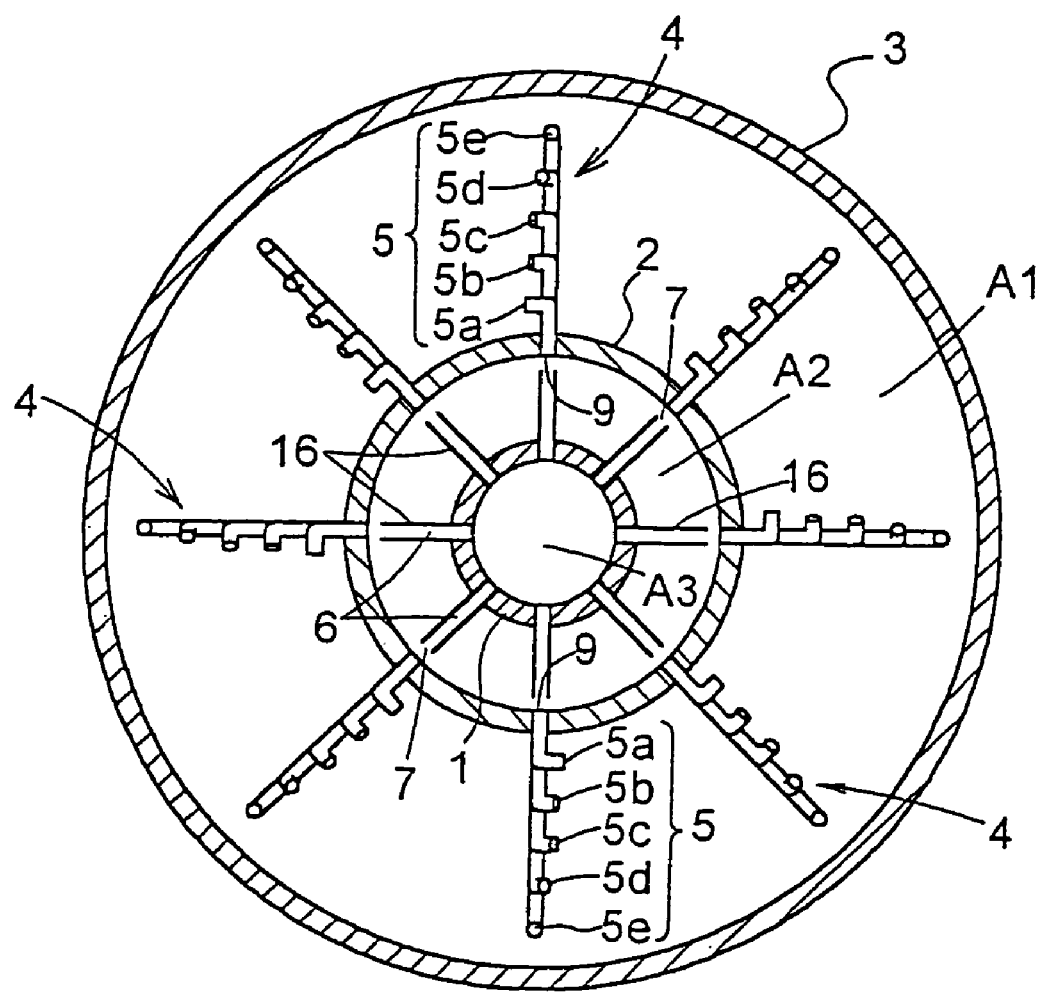
FIG. 22 is a front view in section of the burner apparatus shown in FIG. 21.

Further, as shown in FIG. 20, it is also possible to employ a mixing promoting member 36 constructed as a ring-like member having a plate face for collision with the fuel gas G oriented on the upstream side in the flow direction of the air A in the first channel A1. So that, the fuel gas G having collided against the mixing promoting member 36 will be directed in the direction opposite to the flow direction of the air A while being dispersed in the peripheral direction of the first channel A1, thus being dispersed over the entire first channel A1. As a result, the fuel gas G may be even more uniformly supplied to the first channel A1.

(Eighth Embodiment)

An eighth embodiment of the burner apparatus relating to the present invention will be described next with reference to FIGS. 21–29.

The burner apparatus shown in FIGS. 21–24 is constructed, like the foregoing embodiment, such that its fluid distributor 4 is adapted for receiving, from the second channel A2, at least a portion of the fuel gas G supplied from the second supply opening 7 into the second channel A1 and then supplying it to the first channel A1.

That is, each fluid distributor 4 includes five first supply openings 5a, 5b, 5c, 5d, 5e for supplying fuel gas into the first channel A1, with the openings being distributed in the width direction (the direction away from the second channel A2) of the first channel A1. For each of these five first supply openings 5, there is independently provided a supply line 6 for supplying the fuel gas G inside the gas channel A3, so that the fuel gas may be supplied in distribution into the second channel A2. And, the respective supply lines 6 are constructed such that the distribution ratio of the fuel gas to be supplied to the first supply openings 5 is increased in association with increase in the total supply amount of the fuel gas G from the gas channel A3 to the first channel A1 and to the second channel A2 and conversely the distribution ratio of the fuel gas to the second channel A2 is increased in association with decrease in the total supply amount of the fuel gas G.

That is to say, each supply line 6 includes a nozzle 16 having a second supply opening 7 for discharging the fuel gas G in the second channel A2 from the gas channel A3 in the direction normal to the flow direction of the air A in this second channel A2 and a communication line 8 for receiving the fuel gas G discharged from the second supply opening 7 and guiding it to the first supply opening 5, and the communication line 8 includes a receiving opening 9 at a position opposed to and spaced apart by a predetermined distance from the discharging direction of the second supply opening 7, with the receiving opening being open toward the second supply opening 7.

Further, each fluid distributor 4 is constructed such that discharging resistance of the fuel gas G at each of the first supply openings 5a, 5b, 5c, 5d, 5e due to the passage of the air A is increased as being distant from the second channel A2.

Figure 23:
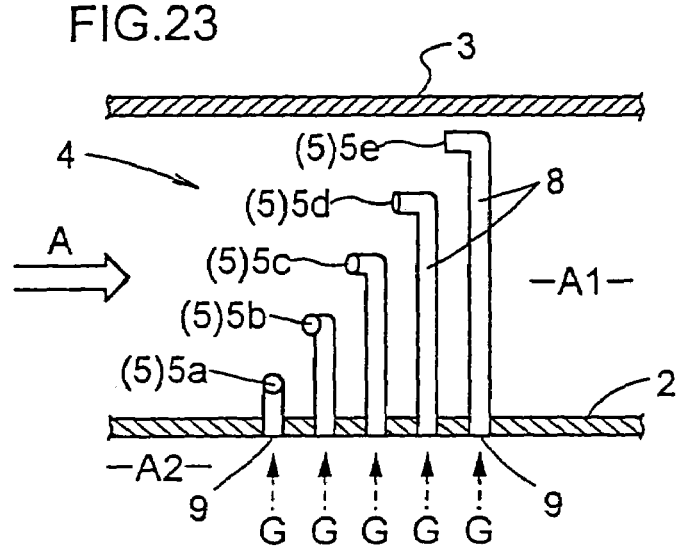
FIG. 23 is an enlarged side view of first supply openings of gas supplying means.
Figure 24:
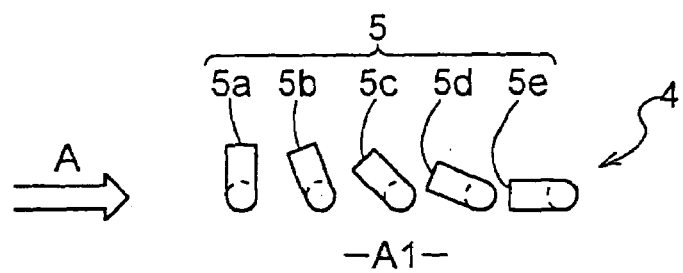
FIG. 24 is an enlarged plan view of the first supply openings of the gas supplying means.

That is, as shown in FIGS. 23 and 24, the opening direction of the first supply opening 5a closest, in the first channel A1, to the second channel A2 is set normal to the flow direction of the air A. Then, the opening directions of the subsequent first supply openings 5 are oriented toward the upstream side in the flow direction of the air A, as being away from the second channel A2, with the opening direction of the first supply opening 5e farthest from the second channel A2 being set on the upstream side in the flow direction of the air A. Namely, in each fluid distributor 4, the discharging angles of the fuel gas from the respective first supply openings 5 relative to the upstream side of the flow direction of the air A in the first channel A1 are decreased gradually as the openings are away from the second channel A2, so that discharging resistance of the fuel gas G due to the passage of the air A at each first supply opening 5 is increased as being away from the second channel A2.

Figure 25:
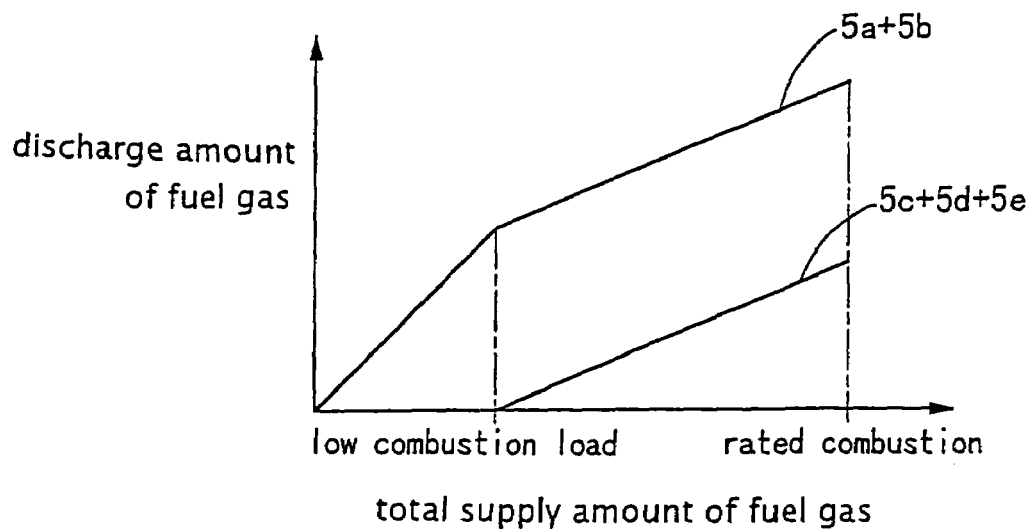
FIG. 25 is a view showing variation of a fuel gas discharging amount relative to a total fuel gas supply amount at each first supply opening.

Therefore, as shown in FIG. 25, in the case of a low-load combustion with reduced gas supply amount from the gas channel A3, of the respective first supply openings 5, the first supply openings 5d, 5e disposed away from the second channel A2, cannot discharge the fuel gas G due to the greater discharging resistance of the fuel gas G and only the other first supply openings 5a, 5b, 5c disposed closer to the second channel A2 and hence providing reduced resistance against the discharge of the fuel gas G can discharge the fuel gas G to the first channel A1. As a result, the fuel gas G passing in the first channel A1 for the main combustion may be ignited and combusted appropriately, in a similar manner to the pilot combustion taking place at the downstream end of the second channel A2.

Next, a modified embodiment of the fluid distributor 4, different from the sixth embodiment, will be described.

Figure 26:
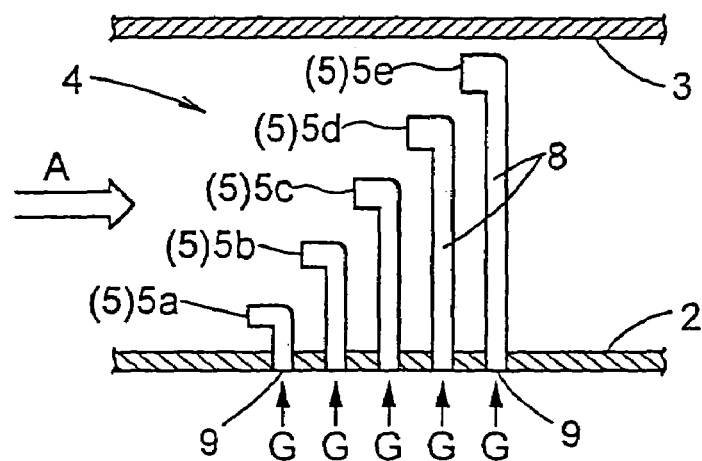
FIG. 26 is an enlarged side view of first supply openings of gas supplying means relating to a modified mode of the eighth embodiment.

In the case of the fluid distributor 4 shown in FIG. 26, the discharging directions of the fuel gas G from five first supply openings 5a, 5b, 5c, 5d and 5e are set to the upstream direction in the flow direction of the air A in the first channel A1. In addition, the opening areas of the respective first supply openings 5a, 5b, 5c, 5d and 5e are set to increase gradually as being away from the second channel A2.

Of these first supply openings 5, discharging resistance of the fuel gas G developed in association with the discharging of the fuel gas in the direction opposed to the flow direction of the air A is gradually increased from the supply opening 5a disposed adjacent the second channel A2 to the first supply opening 5e disposed away from the second channel A2. Hence, like the sixth embodiment described above, it is possible to improve the combustion stability at the time of low-load combustion.

Next, another modified embodiment of the fluid distributor 4, different from the sixth embodiment, will be described.

Figure 27:
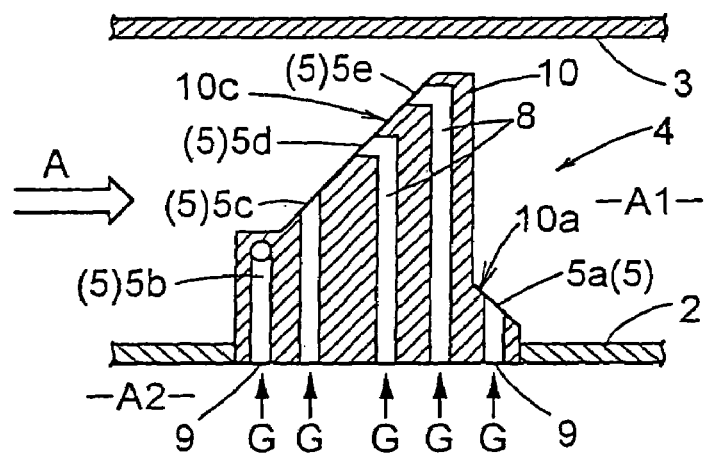
FIG. 27 is an enlarged side view of first supply openings of gas supplying means relating to a modified mode of the eighth embodiment.

In the case of the fluid distributor 4 shown in FIG. 27, five first supply openings 5a, 5b, 5c, 5d, 5e are formed in a plate-like member 10 disposed along the flow direction of the air A in the first channel A1. The openings are open in outer faces of the plate-like member and spaced apart with a predetermined appropriate distance along the flow direction of the air A and the respective communication lines 8 are formed within the plate-like member 10.

Further, in these first supply openings 5, referring first from the closer side to the first channel, the first supply opening 5a is defined in a side face 10a of the plate-like member 10 which extends closer to the second channel A2 on the downstream side of the flow direction of the air A. As this side face 10a faces the downstream side in the flow direction of the air A, the fuel gas G from this supply opening 5a is sucked by the current of the air A toward the first channel A1, thereby to develop a negative discharging resistance for the fuel gas G.

Figure 28:
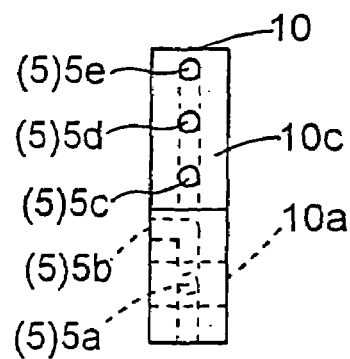
FIG. 28 is an enlarged front view in section showing the first supply openings of the gas supplying means shown in FIG. 27.

Also, the next first supply opening 5b, as shown in FIG. 28, is formed in a further side face 10b of the plate-like member 10 oriented along the flow direction of the air A. So, the discharging resistance of the fuel gas G at this opening is provided only from the static pressure of the air A, thus providing a greater discharging resistance of the fuel gas G than the first supply opening 5a.

The next first supply opening 5c is defined in a side face 10c of the plate-like member 10 oriented away from the second channel A2 on the downstream side of the flow direction of the air A. Hence, due to the shape of the communication line 8 adjacent this first supply opening 5c, the fuel gas g will be discharged in the direction normal to the flow direction of the air A. As the side face 10c faces the upstream side in the flow direction of the air A, this first supply opening 5c provides a greater discharging resistance of the fuel gas G.

The other first supply openings 5d, 5e are formed in the same side face 10c as the above-described first supply opening 5c. However, due to the configurations of the communication lines 8 thereof, these openings discharge the fuel gas G in the direction opposed to the flow direction of the air A. So, that the discharging resistances of the fuel gas C at these respective supply openings 5 may increase as being away from the second channel A2. In this way, like the foregoing embodiment, it is possible to improve the combustion stability at the time of low-load combustion.

Next, a still further modified embodiment of the fluid distributor 4, different from the sixth embodiment, will be described.

Figure 29:
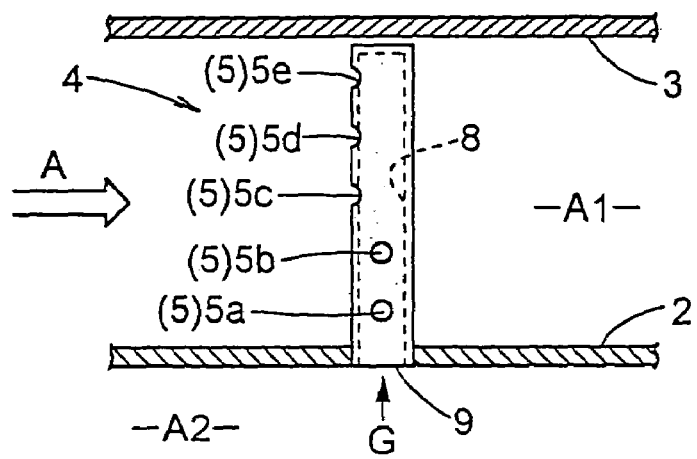
FIG. 29 is an enlarged side view of first supply openings of gas supplying means relating to a modified mode of the eighth embodiment.

In the case of the fluid distributor 4 shown in FIG. 29, the distributor comprises a tubular member having a communication line 8 for receiving, in the first channel A1, the fuel gas from the gas channel A3, the tubular member defining, it its lateral face, first supply openings 5a, 5b, 5c, 5d, 5e. And, in order to allow the discharging resistance of the fuel gas G at the respective first supply openings 5 as being away from the second channel A2, the opening directions of the first supply openings 5a, 5b closer to the second channel A2 in the first channel A1 are set to be normal to the flow direction of the air A, whereas the opening directions of the other first supply openings 5c, 5d, 5e distant from the second channel A2 are set to be the upstream of the flow direction of the air A.

In the case of the burner apparatus relating to this embodiment as well, instead of using the fluid distributors 4 as the gas supplying means, it is possible to effect the supply of the fuel gas from the gas channel A3 to the first supply openings and the second supply openings independently of each other, so that through adjustment of the supply amounts of the fuel gas to the respective supply openings, the fuel gas G may be supplied by a predetermined distribution ratio to the first channel A1 and the main combustion channel and to the second channel A2 as the pilot combustion channel.

(Ninth Embodiment)

A ninth embodiment of a burner apparatus relating to the present invention will be described with reference to FIGS. 30–35.

Figure 30:
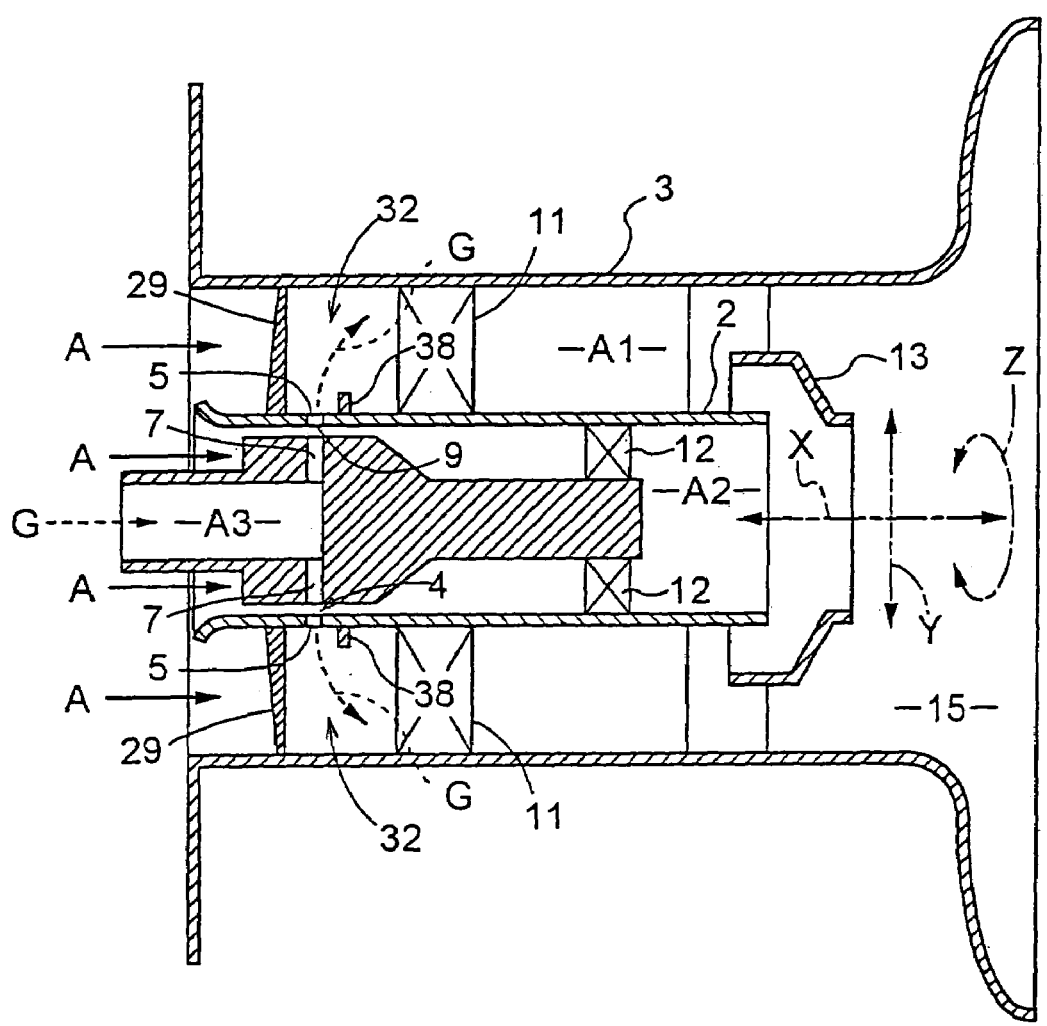
FIG. 30 is a side view in vertical section showing a ninth embodiment of a burner apparatus having fluid distributors according to the present invention.
Figure 31:
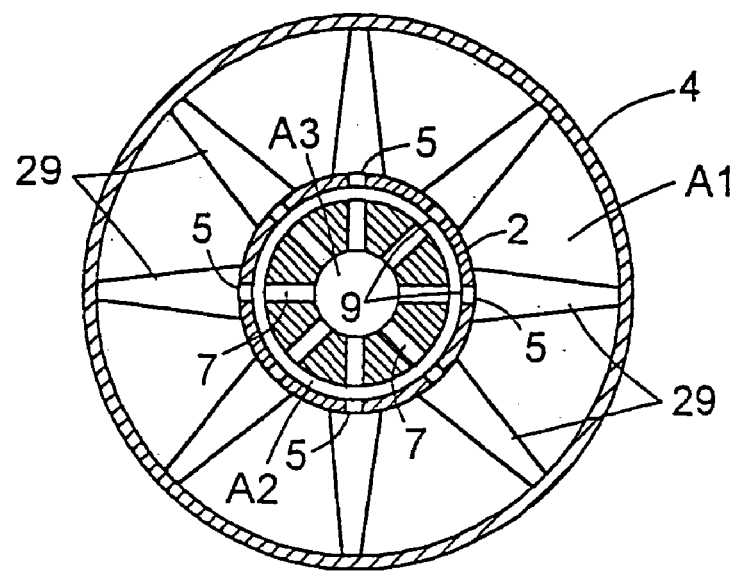
FIG. 31 is a front view in section of the burner apparatus shown in FIG. 30.
Figure 32:
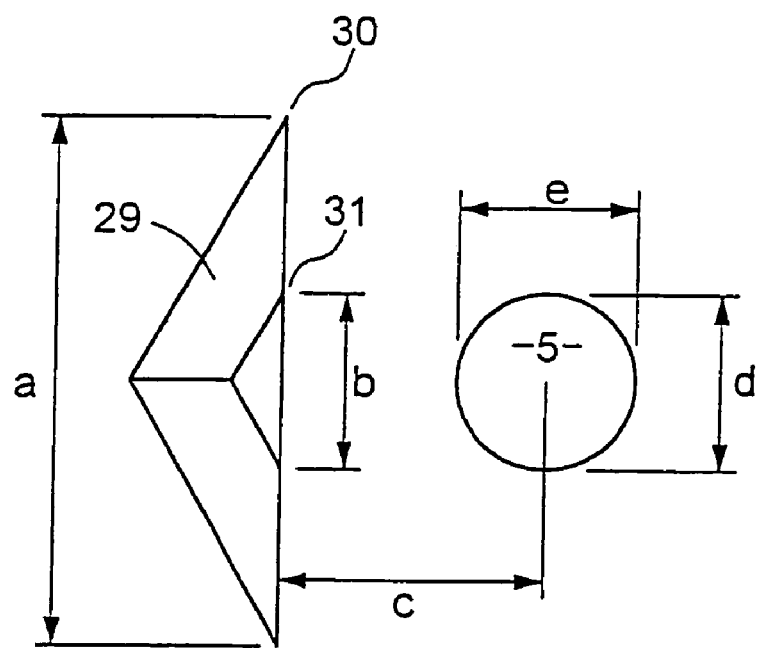
FIG. 32 is an explanatory view showing a setting mode of a first shielding member shown in FIG. 30.

The burner apparatus shown in FIGS. 30–32, like the foregoing embodiments, is constructed such that the fluid distributor 4 may receive, from the second supply opening 7, at least a portion of the fuel gas G supplied from this second supply opening 7 to the second channel A2 and then supply it into the first channel A1.

That is, a single gas channel A3 is communicated only with the second supply opening 7. This second supply opening 7 is open into the second channel A2. Further, the discharging direction of the fuel gas G from the second supply opening 7 is set to be substantially normal to the flow direction of the air A.

And, at apposition opposed to the second supply opening 7, the inner tube 2 defines a receiving opening 9 communicated with the first supply opening 5 provided in the first channel A1. Both the second supply openings 7 and the first supply openings 5 are distributed along the peripheral direction Z of the burner apparatus.

Hence, with such simple construction, it is possible to appropriately set the pilot combustion condition in the second channel A2 and the main combustion condition in the first channel A1.

Along the flow direction of the air A, on the upstream side of the first supply opening 5, there is provided a first shielding member 29 for blocking the flow of the air A. By blocking the flow of the air A, the dispersion degree of the fuel gas G to the first channel A1 is improved. More particularly, in FIG. 30, the fuel gas G discharged from the first supply opening 5 into the first channel A1 flows first outwards along the radial direction Y of the first channel A1. However, if the air A collides sideways this fuel gas G, the fuel gas G will be deflected toward the downstream of the first channel A1. And, if the discharging speed of the fuel gas G is low, there is risk that the gas will not be dispersed sufficiently to the outer periphery of the first channel A1. For this reason, the first shielding member 29 is provided on the upstream side of the first supply opening 5.

In this embodiment, as shown in FIGS. 30 and 31, as the first shielding member 29, there is employed a plate-like member which extends along the radial direction Y of the first channel A1.

This first shielding member 29, as shown in FIG. 32 for example, is constructed such that a ratio: c/e, between a distance (c) from the opening center of the first supply opening 5 defined along the axial direction X and the opening width (e) of the first supply opening 5 is greater than or equal to 0.5 and smaller than or equal to 1.5.

Namely, if c/e is 0.5, the first supply opening 5 contacts the first shielding member 29. Whereas, if c/3 is 1.5, the distance between the first shielding member 29 and the edge of the first supply opening 5 is equal to the opening width (e).

By setting the distance between the first supply opening 5 and the first shied member 29 in the manner described above, it is possible to reliably prevent direct collision between the fuel gas G discharged from the first supply opening 5 an the air A, thereby to prevent the fuel gas G from being carried away by the air A unnecessarily to the downstream side. Hence, the fuel gas G may be dispersed reliably to the outermost side in the first channel A1 and the equivalent ratio between the fuel gas G and the air A in the first channel A1 may be maintained constant for realizing low NOx combustion.

The shape of the first shielding member 29 in its longitudinal direction may be as shown in FIG. 32, for example.

Of the opposed ends of the first shielding member 29, one end adjacent the first supply opening 5 is provided as a first end 30 and the other end away from the first supply opening 5 is provided as a second end 31. The first end 30 has a width (a) along the peripheral direction Z relative to the axial direction X and at the same time, the second end 31 has a width (b) along the peripheral direction Z. Then, the first shielding member 29 is constructed such that for the width (d) of the first supply opening 5 along the peripheral direction Z, the ratio: a/d, between the width (a) and the width (d) may be from 1 and 3 and the ratio: b/d between the width (b) and the width (d) may be from 0 and 2, respectively.

In this way, by setting the width (a) of the first end 30a along the peripheral direction Z of the first channel A1 as 1 to 3 times greater than the width (d) of the first supply opening 5 in the same direction and setting the width (a) of the first end 30 greater than the width (d) of the first supply opening 5, direction collision between the fuel gas discharged from the first supply opening 5 an the air A may be avoided. With this, of the velocity components of the discharged gas G, the velocity component in the radial direction Y may be maintained well especially, thereby to further improve the uniform mixing effect of the fuel gas G in the radial direction Y.

On the other hand, the width (b) of the second end 31 along the peripheral direction Z is set to be greater than or equal to 0 and smaller than or equal to 2 times of the width (d) of the first supply opening 5 in the same direction. The fuel gas G discharged from the first supply opening 5 will flow to the outer side in the radial direction Y with some degree of dispersion. However, depending on the discharging speed of the fuel gas G or other various conditions such as the dimension of the first channel A1 in the radial direction Y, there will occur differences in the dispersion condition of the fuel gas G reaching the vicinity of the second end 31. That is, by increasing/decreasing the amount of air A to collide the fuel gas G depending on this degree of dispersion, the equivalent ratio of the fuel-air mixture is rendered constant.

More particularly, if it is desired to improve the uniform mixing effect of the fuel gas G in the vicinity of the second end 31, the width of the second end 31 is set to be zero so as to allow a great amount of air A to collide the gas. Conversely, if the dispersion of the fuel gas G has developed already in the vicinity of the second end 31, so dispersion of the fuel gas to the outermost side in the first channel A1 is difficult with direction collision with the air A, then, the width (b) of the second end 31 is set to be a greater value such as 2 times greater than the width (d) of the first supply opening 5.

With this construction, it is possible to increase/decrease the degree of dispersion of the fuel gas G in the radial direction Y of the first channel A1. Therefore, the equivalent ration of the fuel-air mixture in the first channel A1 may be rendered uniform. And, low NOx combustion may be achieved while reducing the pressure of the gas supplying means as the fluid distributor 4.

As described above, if the first shied member 29 is provided for preventing the combustion air A from the upstream side along the axial direction X of the first channel A1 from flowing into the first gas supply area 32 to which the fuel gas G is supplied, the fuel gas G supplied along the direction away from the inner tube 2 will be less affected by the flow of the air A, so that the gas may be readily dispersed to the outer side in the first channel A1. For this reason, the mixing between the fuel gas G and the air inside the first channel A1 may be rendered uniform, thus achieving low NOx combustion.

Further, adjacent the downstream side of the first supply opening 5, there is provided a projecting portion 38 projecting from the inner tube 2 toward the first channel A1. With this, the straightness of the fuel gas discharged from the first supply opening 5 may be improved, so that the fuel gas G discharged from the first supply opening 5 into the first channel A1 may be even less affected by the current of air A. Consequently, the mixing between the fuel gas G and the air A can be rendered even more uniform, thus further improving the NOx reduction effect.

Also, if the fuel gas G can be dispersed easily to the outer side in the first channel A1 as described above, the discharging speed of the fuel gas G at the first supply opening 5 may be reduced and accordingly the supplying pressure of the fuel gas G to the first channel A1 may be reduced for instance. As a result, the pressure loss of the fluid distributor may be further reduced and such components as the gas supplying means may be formed compact.

Further, if the dispersion of the fuel gas G to the first channel A1 may take place reliably as described above, the equivalent ratio between the fuel gas G and the air A may be rendered uniform at any given position in the first channel A1. Consequently, such inconvenience as local occurrence of high-temperature combustion can be avoided and the low NOx generation combustion becomes possible.

Next, an embodiment relating to specific dimensions of the first shielding member 29 and the first supply opening 5 and the pressure loss experienced in the supply of fuel gas G to the first channel A1 in that embodiment will be explained.

Figure 33:
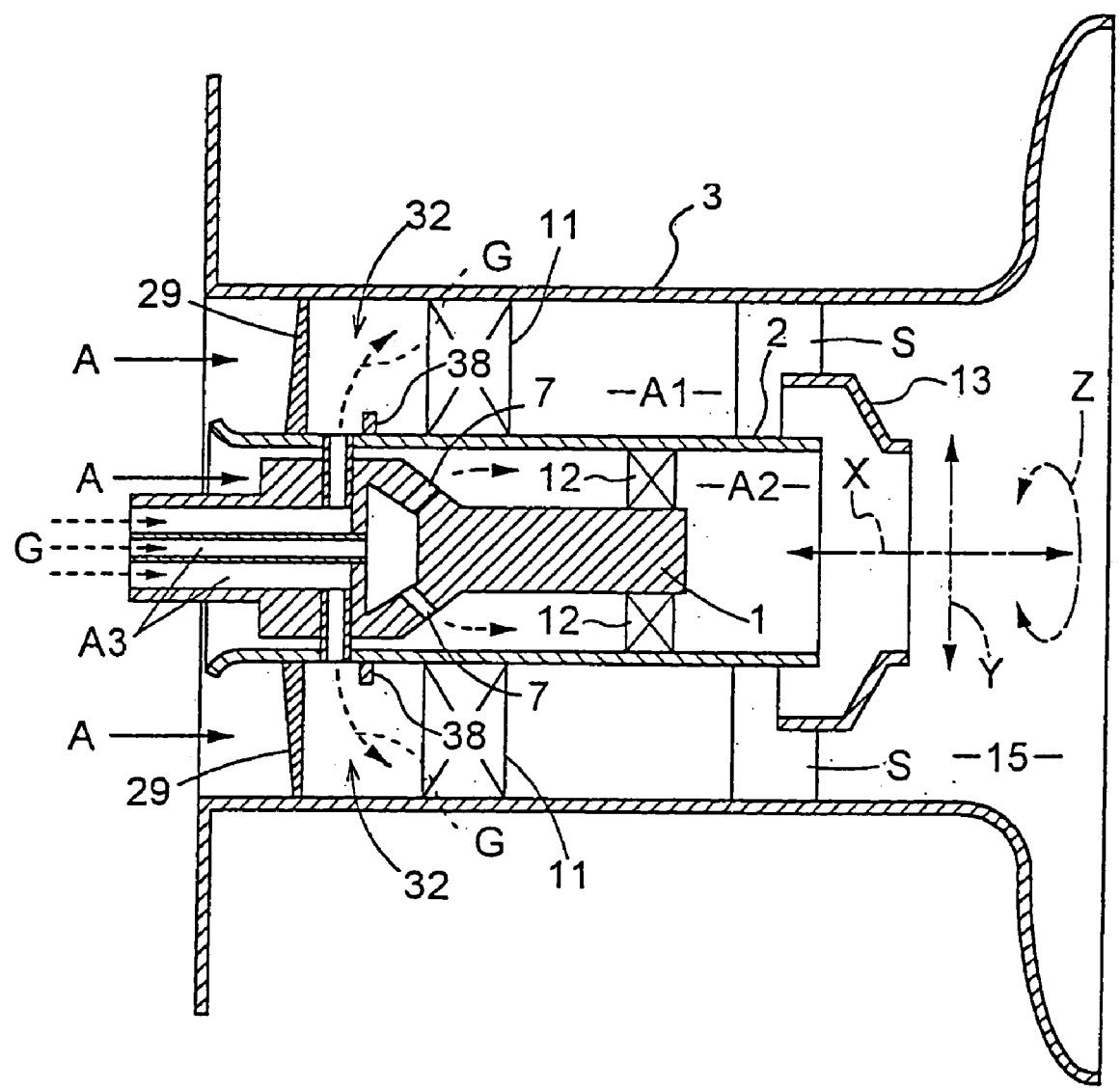
FIG. 33 is a side view in vertical section showing a further embodiment of the burner apparatus shown in FIG. 30.

Incidentally, in this test, in order to confirm the pressure-reduction effect experienced in the supply of the fuel gas G to the first channel A1 as the effect of the first shielding member 29 and the low NOx generation effect due to the uniform mixing in the first channel A1, as shown in FIG. 33, in the burner apparatus of the present invention, instead of using the fluid distributor 4 of the foregoing embodiment, of the two gas channels A3, one of them is communicated with the second supply opening 7 for supplying the fuel gas to the second channel A2 and the other is communicated via the supply line 6 with the first supply opening 5 for supplying the fuel gas G to the first channel A1. And, thus modified gas apparatus was employed for the test.

Further, for the dimensions of the first shielding member 29 and the first supply opening 5, the width (a) of the first end 30 was set as 4.0 mm, the width (b) of the second end 31 was set as 0.2.6 mm, and the distance (c) between the first shielding member 29 and the center of the first supply opening 5 was set as 1.3 mm, and both the opening widths (d), (e) of the first supply opening 5 in the peripheral direction Z and in the axial direction X were set as 2.6 mm. That is, this is the condition in which the first supply opening 5 contacts the first shielding member 29.

On the other hand, the inner diameter of the first supply opening 5 was set as 2.6 mm φ, and the second fuel gas G was supplied to the first channel A1 from eight first supply openings 5.

Then, by using this burner apparatus, a combustion evaluation test was conducted with a testing pressure of 119 kPa (abs) (1.21 kgfcm² (abs)). The results for the burner apparatus of FIG. 33 show the NOx generation amount less than 13 ppm with 0% oxygen conversion. The combustion efficiency was more than 99% and the maximum pressure loss in the supply of fuel to the first channel A1 was 51 kPa (0.52 kgf/cm²).

The conditions employed in the above-described combustion evaluation test were 350° C. for the temperature of air A, 0.35 equivalent ratio of the fuel gas G relative to the air A, 2.6 m³/h (Normal) for the fuel supply amount to the second channel A2, 23.6 m³/h (Normal) for the fuel supply amount to the first channel A1, and 1000° C. for TIT (average temperature at the exit of combustor (entrance to the turbine)).

Figure 34:
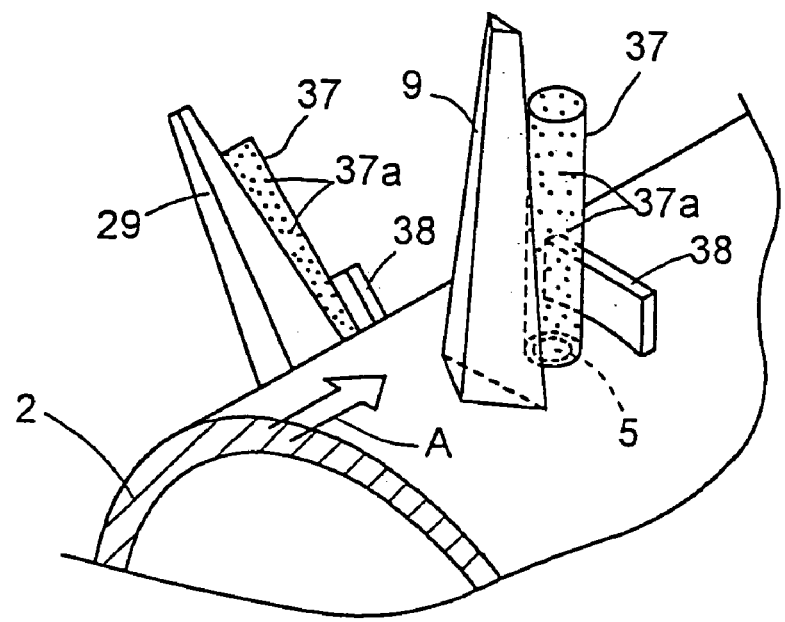
FIG. 34 is a perspective view showing a fuel supplying member provided in the burner apparatus.

The burner apparatus relating to this embodiment, as shown in FIG. 34, may include fuel supplying member 37 in the form of a hollow tube having a porous wall portion 37a, with the member 37 being attached to the first supply opening 5.

The fuel supplying member 37 is capable of supplying in distribution the fuel gas G through the pores formed in its wall portion 37a. If the porous fuel supplying member 37 is attached to the first supply opening 5 as proposed in this embodiment, the fuel gas G may be discharged gradually from the pores formed in the wall portion 37a of the fuel supplying member 37 as the fuel gas G travels along the radial direction Y of the first channel A1. So that, the fuel gas G may be distributed uniformly over the entire first channel A1.

However, it is preferred, for the purpose of preventing pressure loss during fuel supply, that the porous member employed in this construction have coarse pores. That is to say, this fuel supplying member 37 should be capable of restricting, to some extent, the dispersing tendency of the fuel gas G when the gas G travels to the outer side along the radial direction Y. For instance, when this fuel supplying member 37 is disposed in the middle of the current of the air A, the member should have many pores which allow easy entrance of the air A into the fuel supplying member 37.

As this fuel supplying member 37, it is possible to employ a sintered body of various metals, a mesh of metal or the like or an inorganic sintered body, etc.

Then, by providing such fuel supplying member 37 and also the first shielding member 29 on the upstream side of this fuel supplying member 37, the dispersing effects of these members for the fuel gas G may be combined, whereby the fuel gas G may be reliably dispersed to the outer side of the first channel A1.

Further, instead of the above-described plate-like member having the plate face oriented normal to the axial direction which is the flow direction of the air A, as the first shielding member 29, it is possible to employ a plate-like member having a plate face inclined relative to the direction normal to the flow of the air A, or a curved or bent plate-like member in the form of a split tubular member slip along the direction of the tube axis, having a cross section extending toward the inner tube 2 in the form of an arc, an oval arc, u-shaped or v-shaped surrounding at least the upstream side of the first supply opening 5. Or, a tubular member surrounding the first supply opening 5 may be employed as well.

Figure 35:
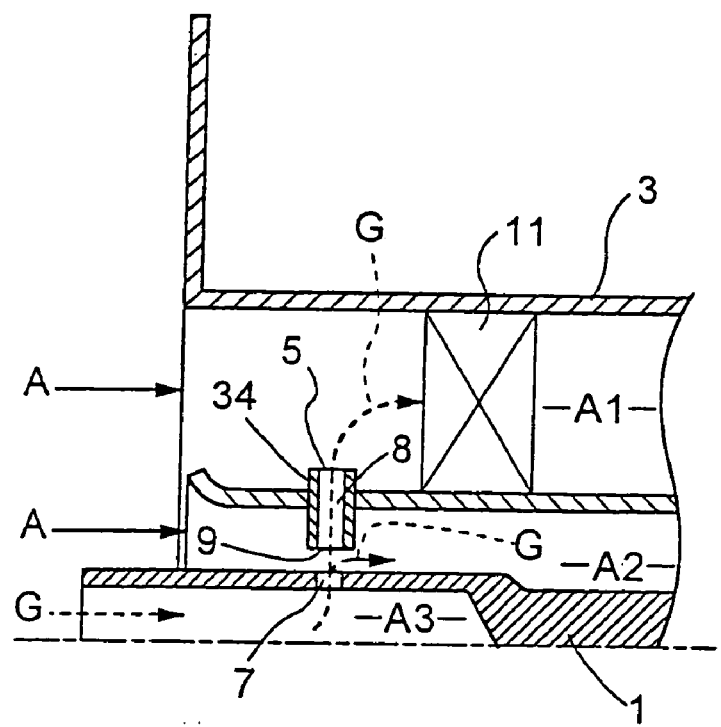
FIG. 35 is a side view of a first supply opening of gas supplying means relating to a modified mode of the ninth embodiment.

Also, if the tubular member is employed instead of the plate-like first shielding member 29 as proposed above, it is also possible to employ a tubular member 34 as shown in FIG. 35 which integrally includes a nozzle as a second shielding member for the second channel A2 and the tubular member as the first shielding member for the first channel A1.

(Tenth Embodiment)

A tenth embodiment of a burner apparatus relating to the present invention will be described next with reference to FIGS. 36–39.

Figure 36:
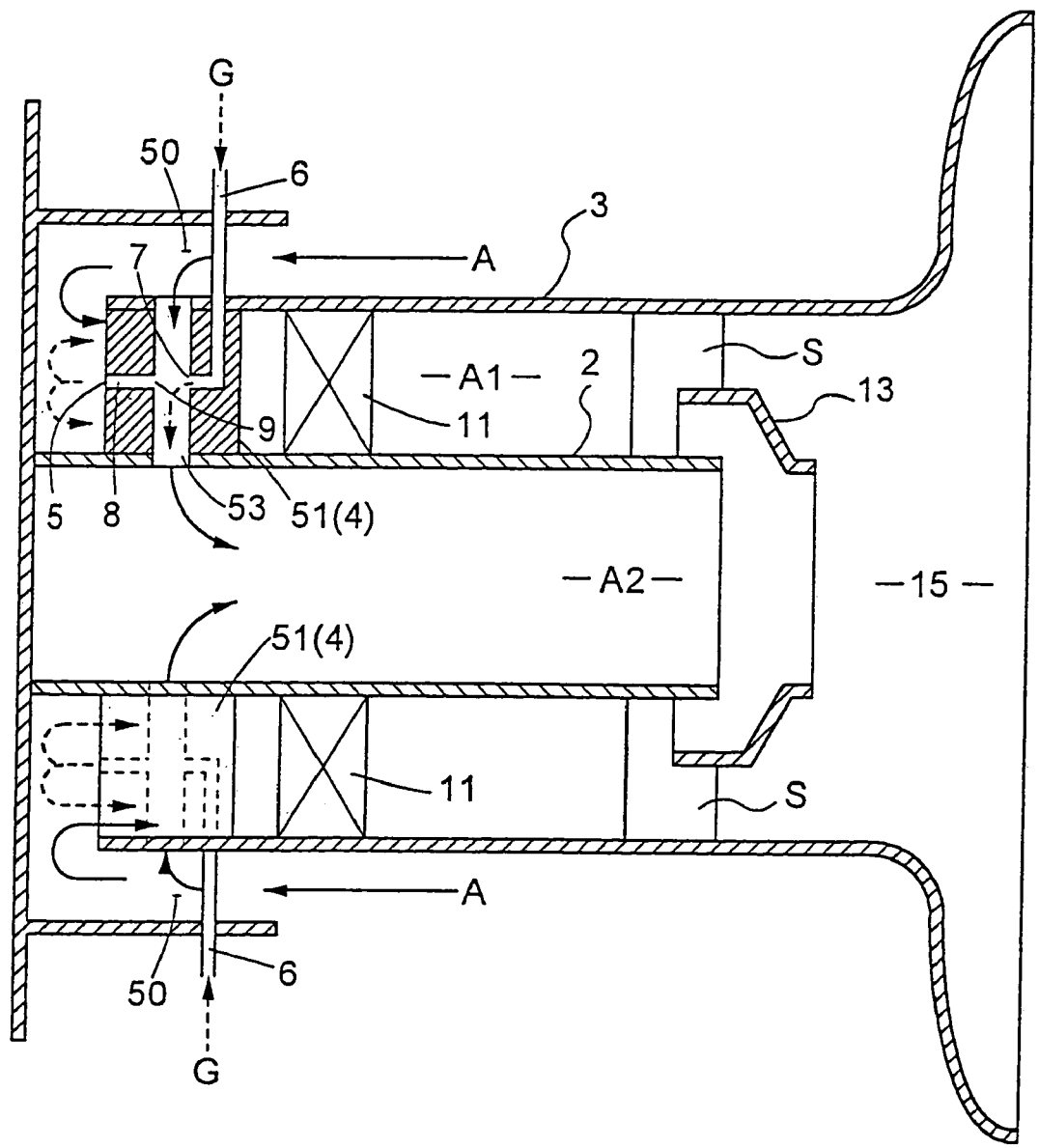
FIG. 36 is a side view in vertical section showing a tenth embodiment of a burner apparatus having fluid distributors according to the present invention.
Figure 37:
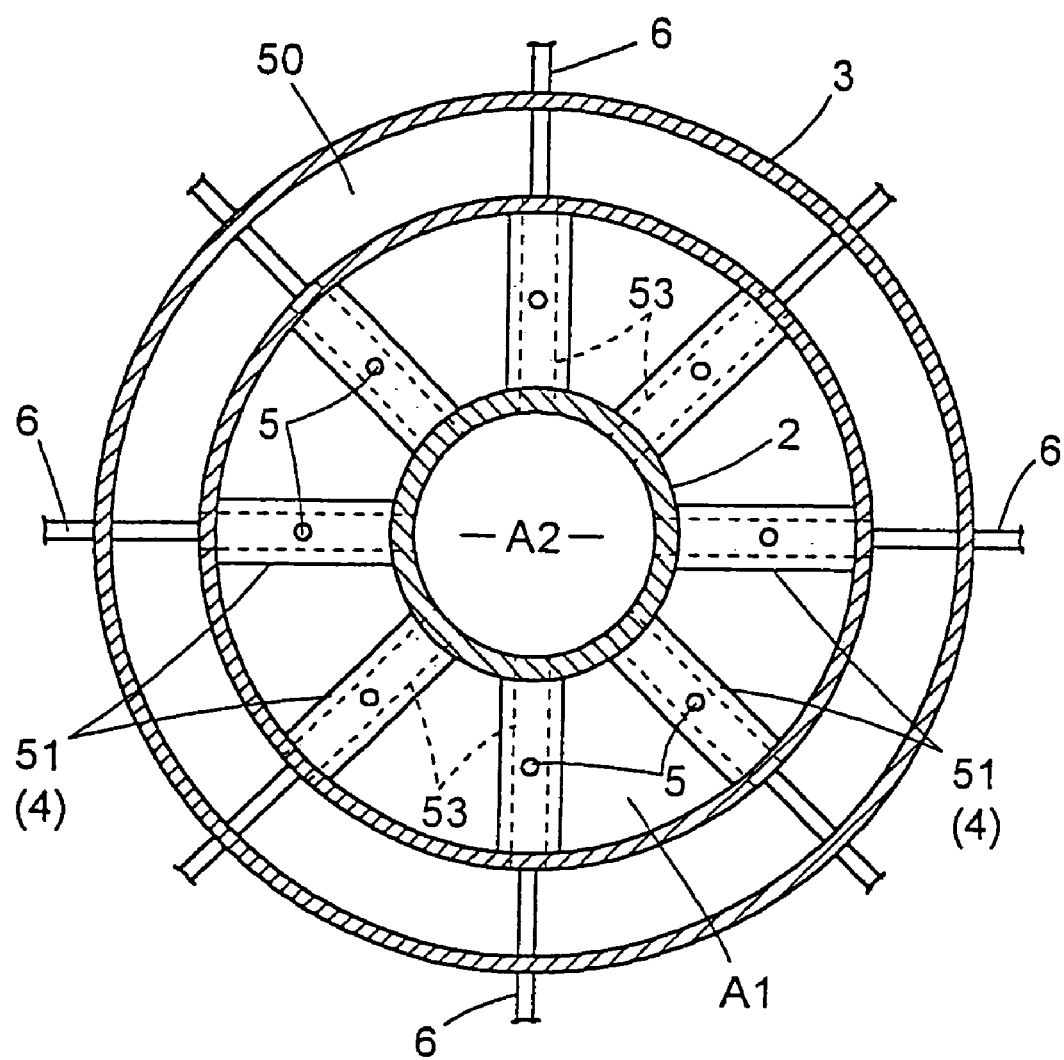
FIG. 37 is a front view in section of the burner apparatus shown in FIG. 36.
Figure 38:
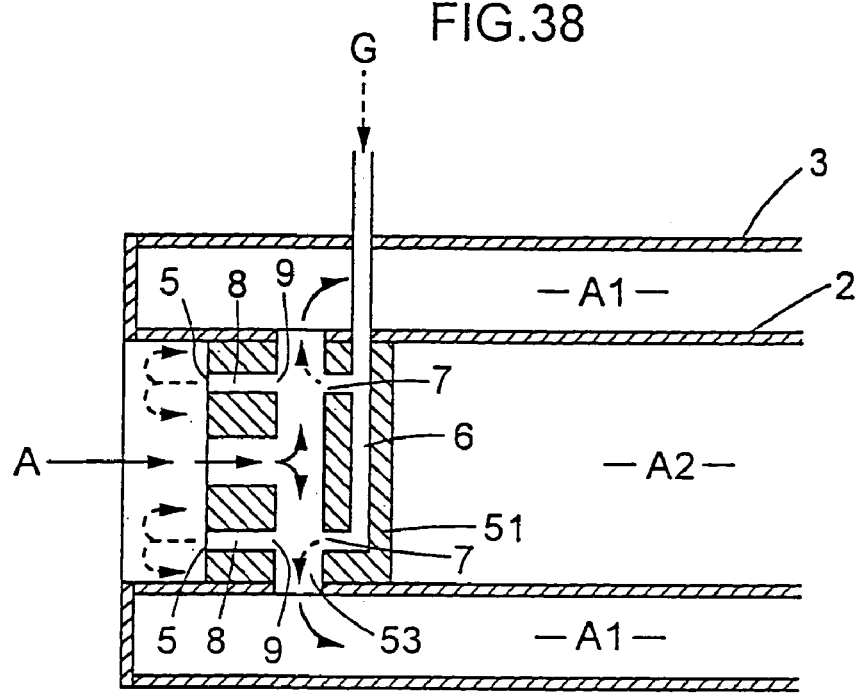
FIG. 38 is a side view in vertical section showing a burner apparatus relating to a modified mode of the tenth embodiment.

The burner apparatus shown in FIGS. 36 and 37 is the so-called counter-flow type burner apparatus in which an air channel 50 is provided for receiving supply of the air A in the opposite direction to the flow direction of the fuel gas in the combustion chamber 15 and the air A is supplied from this air channel 50 to the first channel A1 and the second channel A2.

Further, the fluid distributors 4 are provided in the first channel A1 as the main combustion channel and each distributor 4 comprises a distributing member 51 which defines; in its outer face, a first supply opening 5 and which defines, therein, a supply line 6 and an air inlet duct 53 for guiding the air A supplied from the air channel 50 to the second channel A2 as the pilot combustion channel. The fluid distributing means, includes, in said distributing member 51, a second supply opening 7 for discharging the fuel gas G into the air inlet duct 53 in a direction intersecting the flow direction of the air A inside the air inlet duct 53, a communication line 8 for receiving the fuel gas G discharged from the second supply opening 7 and guiding it to the first supply opening 5, and a receiving opening 9 for the communication line 8 disposed at a position opposing to the second supply opening 7 with a predetermined distance relative thereto in the discharging direction, with the receiving opening 9 being open to the second supply opening 7.

Figure 39:
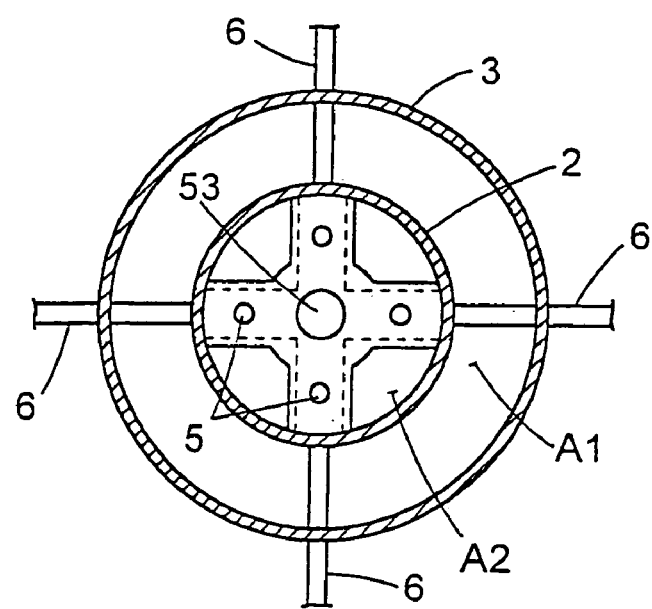
FIG. 39 is a front view in section of the burner apparatus shown in FIG. 38.

Further, the distributing means 51 is a plate-like member disposed within the first channel A1, with its plate face oriented along the flow direction of the air in the first channel A1. And, as shown in FIG. 39, as this plate-like distributing member 51, eight of them are disposed at eight positions equidistantly in the peripheral direction of the first channel A1, so that the air A supplied to the first channel may pass the outer face of the distributing means 51 substantially without any disturbance.

With the above-described construction of the fluid distributor 4, in the gas supply area where the fuel gas G discharged from the second supply opening 7 in the air inlet duct 53 within the distributing member 51 is present, a portion of the fuel gas G transversing the air inlet duct 53 is carried way by the air current of the air inlet duct 53 to flow to the second channel A2, while the rest of the gas flows through the air current of the air inlet duct 53 to reach the first supply opening 5 via the receiving opening 9 to be supplied to the first channel A1 eventually. More particularly, of the fuel gas G discharged from the second supply opening 7 into the air inlet duct 53, the fuel gas portion introduced into the communication line 8 via the receiving opening 9 will be guided to the first supply opening 5 to be supplied to the first channel A1. whereas, the other fuel gas portion not introduced into the receiving opening 9 will be supplied via the air inlet duct 53 to the second channel A2. And, the greater the amount and the greater the speed of the supply of the fuel gas G discharged from the second supply opening 7, the higher the ratio of the portion of the discharged fuel gas G introduced into the receiving opening 9. As a result, the greater the supply amount of the fuel gas G, the higher the distribution ratio of the fuel gas G to the side of the first supply opening 5, i.e. to the side of the first channel A1. Conversely, the smaller the amount of the supply of the fuel gas G, the lower the distribution ratio of the fuel gas to the side of the main combustion channel.

Further, as the first supply opening 5 is formed in the outer face of the distributing member 51, with the opening being open in the opposite direction to the flow direction of the air A in the first channel A1, like the fifth embodiment described above, it is not necessary increase the supply pressure of the gas supplying means and the fuel gas G may be discharged with a pressure just enough to overcome the pressure of the air A. Accordingly, it is possible to set the discharging pressure or the discharging speed of the fuel gas G low. As a result, the pressure-loss in the course of the supply of the fuel gas G may be reduced.

Also, instead of the plate-like shape described above, the plate-like member 51 may be constructed in a form which does not significantly disturb the air flow in the first channel A1. For instance, sit may be formed as a column-like member having a height along the radial direction of the first channel. And, by providing this column-like member with a cross-sectional shape such as a circular shape, an oval shape having the major axis along the flow direction of the air A, a triangular shape having the apex on the upstream side in the flow direction of the air A, or a streamline shape along the flow direction of the air A, it is possible to construct the distributing member 51 so as not to significantly disturb the flow of the air A.

This burner apparatus, conversely of the burner apparatuses described hereinbefore, is an apparatus in which the first channel A1 is used as the pilot combustion channel and the second channel is used as the main combustion channel.

In operation, the air A supplied from the air supplying means is supplied first to the second channel A2 and a portion of this air A supplied to the second channel A2 as the main combustion channel is supplied via the air inlet duct 53 formed in a distributing member 51 (described later) to the first channel A1 as the pilot combustion channel.

That is, the distributor member 51 is provided in the second channel A2 as the main combustion channel. As shown in FIG. 39, this member includes, at the center thereof, an entrance opening of the air inlet duct 53 open in the direction opposed to the flow direction of the air A and the air inlet duct 53 is formed inside a portion of the member extending radially from the center toward the inner tube 2, so that the air A introduced into the air inlet duct 53 is supplied to the first channel A1.

And, the distributing means includes, in the supply line 6 of this distributing member 51, a second supply opening 7 for discharging the fuel gas G into the air inlet duct 53 in a direction intersecting the flow direction of the air A inside the air inlet duct 53 and a communication line 8 for receiving the fuel gas G discharged from the second supply opening 7 and guiding it to the first supply opening 5, and a receiving opening 9 for the communication line 8 disposed at a position opposing to the second supply opening 7 with a predetermined distance relative thereto in the discharging direction, with the receiving opening 9 being open to the second supply opening 7. So that, the fuel gas may be supplied in distribution with a distribution ratio adjustment between the first channel A1 and the second channel A2.

(Eleventh Embodiment)

Next, an eleventh embodiment of the burner apparatus relating to the present invention will be described with reference to FIGS. 40 through 42.

Figure 40:
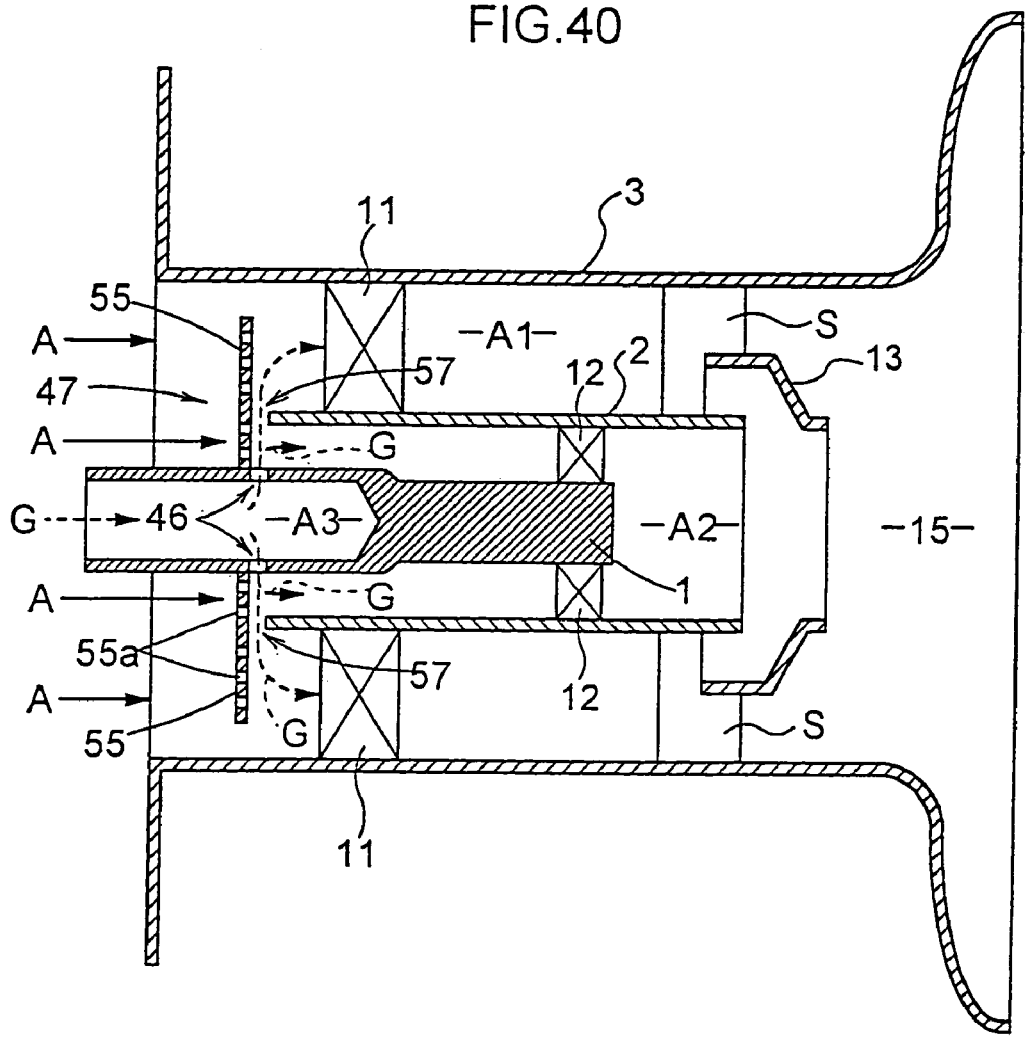
FIG. 40 is a side view in vertical section showing an eleventh embodiment of a burner apparatus having fluid distributors according to the present invention.
Figure 41:
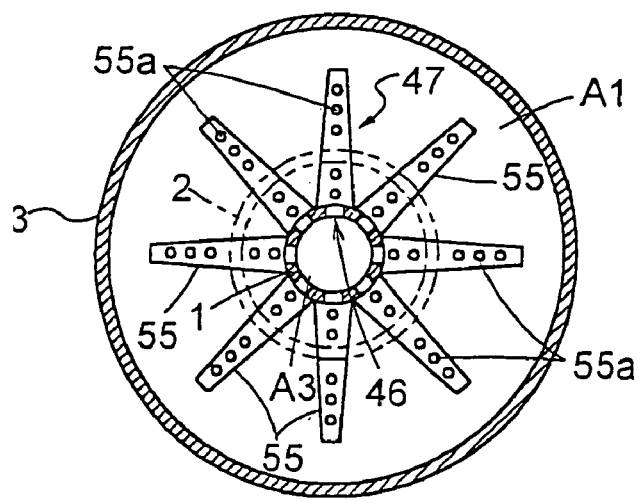
FIG. 41 is a front view in section of the burner apparatus shown in FIG. 40.
Figure 42:
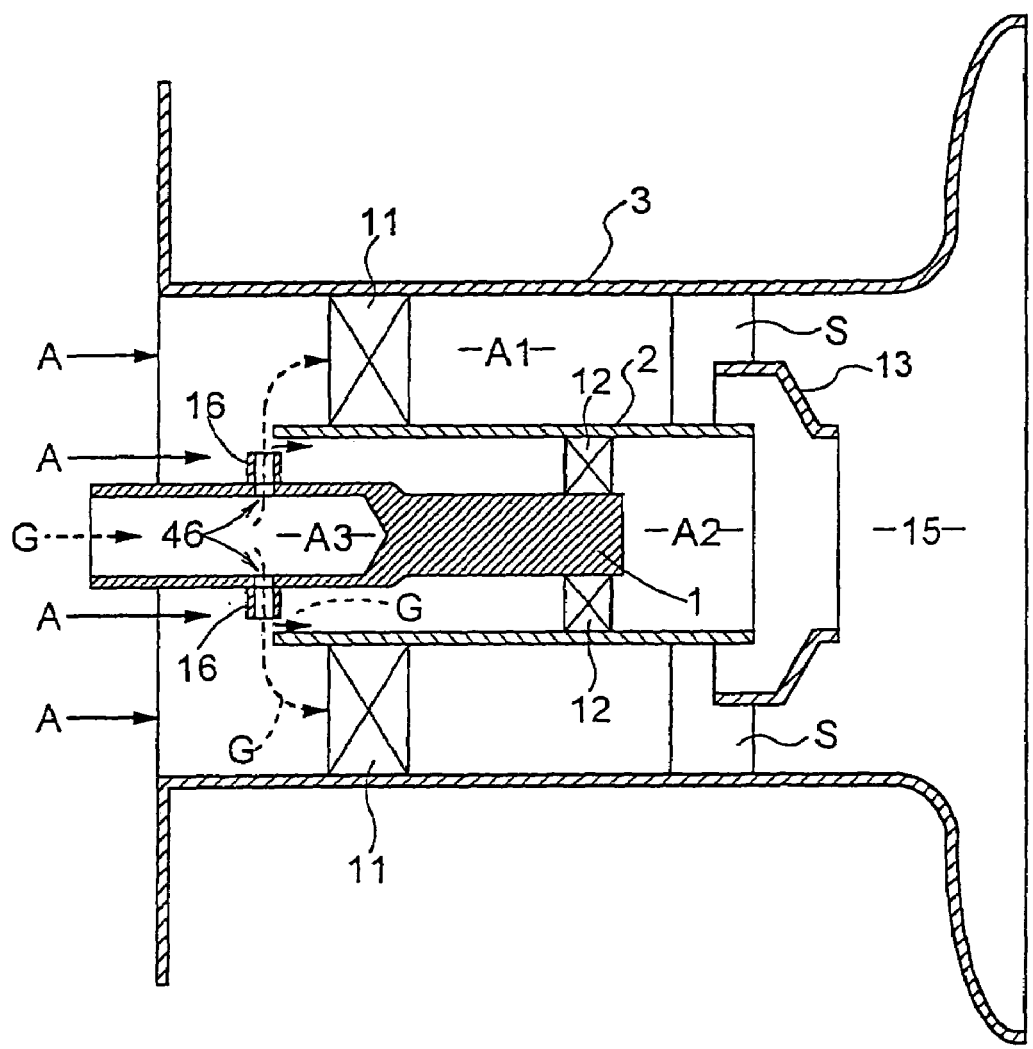
FIG. 42 is a side view in vertical section showing a burner apparatus relating to a modified mode of the eleventh embodiment.

With the burner apparatus shown in FIGS. 40 and 41, like the foregoing embodiments, the gas tube 1 includes a supply opening 46 (an example of common supply opening). However, the upstream end of the inner tube 2 in the flow direction of the air A is the terminal end of the supply opening 46 in the flow direction of the air A. The air A supplied to a common channel 47 formed on the upstream thereof is divided between the first channel 1 and the second channel 2 on the downstream side of the supply opening 46. And, the fuel gas G is discharged from the supply opening into the gas supply area extending in the width direction of the common channel 47.

That is, a portion of the fuel gas G supplied from the supply opening 46 to the gas area is supplied to the second channel A2 as being carried by the flow of the air A, while the rest of the gas will overcome the flow of the air A and reach the common channel 47 upstream of the first channel A1 via a plate-like member 55 to be described later and a gap 57 formed at the upstream end of the first channel A1 in the flow direction of the air A, to be supplied eventually to the first channel A1. Accordingly, with a single fuel gas supplying means, it is possible to supply the fuel gas G in distribution to the first channel A1 and to the second channel A2. Moreover, it is also possible to increase the distribution ratio of the fuel gas to the second channel 2 in association with increase in the total supply amount of the fuel gas G from the gas channel A1 to the first channel A1 and the second channel A2 and to conversely increase the distribution ratio of the fuel gas to the second channel A2 in association with decrease in the total supply amount of the fuel gas G.

Further, in the burner apparatus according to this embodiment, there is provided the palate-like member 55 (an example of a common shielding member) which is disposed on the upstream side of the gas area in the flow direction of the air A and which has a plate face oriented normal to the flow direction of the air A. This plate-like member 55 appropriately adjust the inflow amount of the air A by restricting entrance of the air A into the gas area where the fuel gas G is discharged.

With this plate-like member 55, like the above-described embodiments, it is possible to appropriately adjust the distribution ratio of the fuel gas G which flows into the first channel A1 and the second channel A2, whereby the distribution ratio of the fuel gas G may be adjusted to suit the operating condition of the burner apparatus.

Further, in order to adjust the inflow condition of the air A into the gas area where the fuel gas G is discharged, the plate-like member 55 may include a number of openings 55a, so that the distribution ratio of the fuel gas G may be adjusted even more appropriately. The shape of this opening 55a may be circular, semi-circular, oval or semi-oval, slit-like, or any polygonal shape. The specific shape may be determined with consideration of cost and performance, etc.

Further, in the burner apparatus of the present invention, instead of the plate-like member having a plate face extending normal to the axial direction, i.e. the flow direction of the air A, as the plate-like member 55, it is also possible to employ a plate-like member having a plate face inclined relative to the direction normal to the flow of the air A, or a curved or bent plate-like member in the form of a split tubular member slip along the direction of the tube axis, having a cross section extending toward the outer tube 4 in the form of an arc, an oval arc, u-shaped or v-shaped surrounding at least the upstream side of the second supply opening 7. And, as shown in FIG. 42, it is also possible to provide, in the common channel 47 on the upstream of the second channel A2, a tubular member 11 having the supply opening 46 of the gas tube 1 extending from the outer periphery to the portion immediately before the upstream end of the inner tube 2.

(Twelfth Embodiment)

A twelfth embodiment of the burner apparatus according to the present invention will be described next with reference to FIG. 43.

Figure 43:
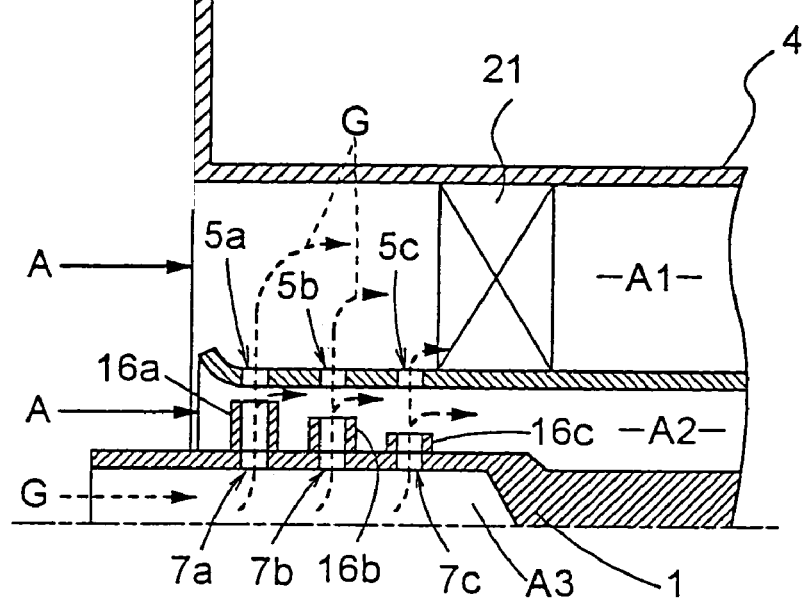
FIG. 43 is a side view in vertical section showing a twelfth embodiment of a burner apparatus having fluid distributors according to the present invention.

In the burner apparatus shown in FIG. 43, second supply openings 7a, 7b, 7c and first supply openings 5a, 5b, 5c may be provided at a plurality of positions along the flow direction of the air A. Also, for the respective second supply openings 7a, 7b, 7c, e.g. tubular nozzles 16a, 16b, 16c may be provided. Also, in this case, the heights (projecting amounts into the second channel A2) of the respective nozzles 16a, 16b, 16c may be adjusted to become shorter along the flow direction of the air A. So, that the distribution conditions of the fuel gas G from the respective second supply openings 7a, 7b, 7c to the first supply openings 5a, 5b, 5c may be varied so as to supply the fuel gas G over a wide area in the first channel 1 and the second channel 2.

In the embodiments described above, as a general example, air is employed as the oxygen-containing gas for fuel combustion. Instead, as an oxygen-containing gas for fuel combustion other than the air, it is also possible to employ e.g. an oxygen-enriched gas having a higher content of oxygen than air.

The burner apparatus relating to the present invention may be constructed as a straight-flow burner apparatus in which the flow direction of the air supplied to the main and pilot combustion channels agrees with the flow direction of the fuel gas in the combustion chamber 15 or as a counter-flow burner apparatus in which the air flows in the outer side of the outer tube 3 in the opposite direction to the flow direction of the fuel gas in the combustion chamber 15 to be supplied to the respective combustion channels.

INDUSTRIAL APPLICABILITY

As described above, the burner apparatus and fluid distributor according to the present invention are useful as a fluid distributor and a burner apparatus utilizing the distributor with which the adjustment of the supply amounts of the fuel gas to the main combustion channel and the pilot combustion channel may be effected easily and also the distribution ratio of the supply amount to the pilot combustion channel may be increased in association with decrease in the supply amount. In particular, these are suitable for a gas turbine engine for electricity generation, a co-generation system including such gas turbine engine or as a burner apparatus for use in e.g. an incinerator.

What is claimed is:

1. A burner apparatus comprising an inner tube defining a second channel and an outer tube defining a first channel surrounding the inner tube, oxygen-containing gas supplying means supplying oxygen-containing gas to the first channel and the second channel, and gas supplying means supplying fuel gas to the first channel and the second channel, either the first channel or the second channel being used as a main combustion channel and the other being used as a pilot combustion channel, the main combustion channel and the pilot combustion channel receiving the supply of fuel gas for combusting it;

wherein a plurality of first supply openings supplying the fuel gas into the first channel are distributed in the first combustion channel at gradually increasing radial distances away from the second channel;

said first supply openings are oriented such that fuel gas from each of said first supply openings encounters a discharge resistance caused by the flow of the oxygen-containing gas; and each one of said discharge resistances increases as said supply openings become more radially distant from the second combustion channel.

2. The burner apparatus according to claim 1, wherein the setting of the discharge resistance of the fuel gas is done such that a discharging angle for the fuel gas of each one of said first supply openings toward the upstream side of the flow direction of the oxygen-containing gas in the first combustion channel is decreased as the distance from the second combustion channel is increased.

3. The burner apparatus of claim 1, wherein the setting of the discharging resistance of the fuel gas is done such that the discharging direction of the fuel gas from the plurality of first supply openings is oriented to be gradually more upstream than the direction normal to the flow direction of the oxygen-containing gas in the first combustion channel, and the opening area of each one of said first supply openings is increased at radially increasing distances away from the second combustion channel.

* * * * *